United States Patent

Isozaki et al.

Patent Number: 6,153,953
Date of Patent: *Nov. 28, 2000

[54] MULTI-PHASE PM-TYPE STEPPING MOTOR

[75] Inventors: Kouki Isozaki, Kiryu; Naotugu Sato; Yuuichi Tsuda, both of Kasakake-machi, all of Japan

[73] Assignee: Japan Servo Co., Ltd., Tokyo-to, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/129,701

[22] Filed: Aug. 5, 1998

[30] Foreign Application Priority Data

| Aug. 5, 1997 | [JP] | Japan | 9-222076 |
| Oct. 28, 1997 | [JP] | Japan | 9-311035 |
| Nov. 6, 1997 | [JP] | Japan | 9-319136 |

[51] Int. Cl.⁷ ............ H02K 37/00; H02K 1/22; H02K 7/20; H02K 16/00; H02P 8/00
[52] U.S. Cl. .......... 310/49 R; 310/257; 310/261; 310/112; 310/114; 318/696; 318/685
[58] Field of Search ............... 310/49 R, 49 A, 310/67 R, 68 R, 156, 162, 164, 184, 185, 193, 216, 254, 257, 261, 265, 262, 168, 263, 112, 114, 268; 318/496, 696, 685

[56] References Cited

U.S. PATENT DOCUMENTS

| 3,293,460 | 12/1966 | Iwai et al. ............... 310/49 R |
| 3,401,322 | 9/1968 | O'Regan ............... 310/49 R |
| 3,549,918 | 12/1970 | Hout ............... 310/49 R |
| 4,127,802 | 11/1978 | Johnson ............... 318/696 |
| 4,206,374 | 6/1980 | Goddijn ............... 310/49 R |
| 4,306,164 | 12/1981 | Itoh et al. ............... 310/49 R |
| 4,347,457 | 8/1982 | Sakamoto ............... 310/256 |
| 4,384,226 | 5/1983 | Sato et al. ............... 310/89 |
| 4,385,247 | 5/1983 | Satomi ............... 310/49 R |
| 4,406,958 | 9/1983 | Palmero et al. ............... 310/49 R |
| 4,499,391 | 2/1985 | Sakamoto ............... 310/89 |
| 4,503,368 | 3/1985 | Sakamoto ............... 310/49 R |
| 4,607,204 | 8/1986 | Setoya ............... 318/696 |
| 4,672,253 | 6/1987 | Tajima et al. ............... 310/269 |
| 4,675,564 | 6/1987 | Isozaki ............... 310/49 R |
| 4,739,201 | 4/1988 | Brigham et al. ............... 310/49 R |
| 4,755,732 | 7/1988 | Audo ............... 318/696 |
| 4,764,697 | 8/1988 | Christiaens ............... 310/49 R |
| 4,899,072 | 2/1990 | Ohta ............... 310/49 R |
| 4,983,867 | 1/1991 | Sakamoto ............... 310/49 R |
| 5,032,747 | 7/1991 | Sakamoto ............... 310/49 R |
| 5,111,242 | 5/1992 | Tanimoto et al. ............... 355/200 |
| 5,128,570 | 7/1992 | Isozaki et al. ............... 310/49 R |
| 5,132,603 | 7/1992 | Yoshimoto ............... 318/696 |
| 5,243,246 | 9/1993 | Sakamoto ............... 310/179 |
| 5,270,597 | 12/1993 | Yubazaki et al. ............... 310/49 R |
| 5,289,064 | 2/1994 | Sakamoto ............... 310/49 R |
| 5,386,161 | 1/1995 | Sakamoto ............... 310/49 R |
| 5,410,200 | 4/1995 | Sakamoto et al. ............... 310/49 R |
| 5,693,989 | 12/1997 | Satomi et al. ............... 310/12 |
| 5,719,452 | 2/1998 | Sugiura ............... 310/49 R |
| 5,760,503 | 6/1998 | Tsuchida et al. ............... 310/49 R |
| 5,780,944 | 7/1998 | Sakamoto ............... 310/49 R |
| 6,028,377 | 2/2000 | Sakamoto ............... 310/49 R |

*Primary Examiner*—Nestor Ramirez
*Assistant Examiner*—Dang Dinh Le
*Attorney, Agent, or Firm*—Oblon, Spivak, McClelland, Maier & Neustadt, P.C.

[57] ABSTRACT

A multi-phase PM-type stepping motor comprising: a rotor constituted by a cylindrical permanent magnet with N poles and S poles magnetized alternately on an outer circumferential surface of the rotor; stator cores having teeth arranged in opposition to the N poles or the S poles on the outer circumferential surface of the rotor through a predetermined air gap; and excitation coils wound in the stator cores and for magnetizing the stator cores to thereby rotate the rotor; wherein, when the number of the stator cores is represented by n (n is an odd number not smaller than 5), and the magnetization pitch angle of the permanent magnet is represented by P, the teeth of the stator cores are shifted from each other by an angle of 2P/n.

5 Claims, 27 Drawing Sheets

FIG. 12

| M | $\tau r$ | $\theta s = \frac{1}{6} \tau r$ |
|---|---|---|
| 2 | 360° | 60° |
| 4 | 180° | 30° |
| 6 | 120° | 20° |
| 8 | 90° | 15° |
| 10 | 72° | 12° |
| 12 | 60° | 10° |
| 14 | 51.43° | 8.57° |
| 16 | 45° | 7.5° |
| 18 | 40° | 6.66° |
| 20 | 36° | 6° |
| 22 | 32.73° | 5.45° |
| 24 | 30° | 5° |
| ⋮ | ⋮ | ⋮ |

FIG. 30

| M | $\tau r$ | $\theta s = \tau r / 10$ |
|---|---|---|
| 2 | 360 | 36.0 |
| 4 | 180 | 18.0 |
| 6 | 120 | 12.0 |
| 8 | 90 | 9.0 |
| 10 | 72 | 7.2 |
| 12 | 60 | 6.0 |
| 14 | 51.43 | 5.14 |
| 16 | 45 | 4.5 |
| 18 | 40 | 4.0 |
| 20 | 36 | 3.6 |
| 22 | 32.73 | 3.27 |
| 24 | 30 | 3.0 |
| . | . | . |

MULTI-PHASE PM-TYPE STEPPING MOTOR

BACKGROUND OF THE INVENTION

1. Field of the Invention

The present invention relates to a multi-phase PM-type stepping motor suitable for office automation equipments such as printers, high-speed facsimile equipments, plain paper copiers (PPCs), and so on.

2. Description of the Related Art

A single-phase PM-type stepping motor which is a first example of prior art will be described with reference to FIGS. 34 and 35.

FIG. 34 is a vertically-sectioned side view of a single-phase PM-type stepping motor 30 which is a first example of prior art. In FIG. 34, the reference numeral 31 represents a cylindrical rotor in which N (north) and S (south) poles are formed alternately in the circumferential direction in the outer circumferential surface thereof; 32, a rotating shaft of the rotor 31; and 33, a ring-like stator disposed so that the inner circumferential surface thereof is opposite to the outer circumferential surface of the rotor 31 through a gap.

The reference numeral 34 represents a stator coil constituting the stator 33; 35, a stator yoke; 36a and 36b, motor mounting plates fixed to the stator yoke 35; and 37a and 37b, bearings provided on the mounting plates 36a and 36b respectively for rotatably supporting the rotating shaft 32.

Next, the stator 33 will be described in detail with reference to FIG. 35. FIG. 35 is a vertically-sectioned side view illustrating the stator 33 in an exploded state.

The stator yoke 35 is constituted by one and the other ring-like yoke elements 39a and 39b provided with comb-like pole teeth 38a and 38b extending in the axial direction along the inner circumferential surface of the stator coil 34. The pole teeth 38a and 38b are disposed so as to be adjacent to each other while shifted from each other in the circumferential direction.

The stator coil 34 is constituted by a ring-like bobbin 40 surrounded by the yoke elements 39a and 39b and the pole teeth 38a and 38b, and a ring-like coil 41 wound on this bobbin 40.

Next, description will be made about a two-phase PM-type stepping motor, which is a second example of prior art, with reference to FIG. 36.

FIG. 36 is a vertically-sectioned side view of a two-phase PM-type stepping motor 50 which is a second example of prior art. In this stepping motor 50, a stator 53 is constituted by first and second stator portions 53a and 53b ganged together in the axial direction.

In the single-phase PM-type stepping motor described above as the first example of prior art, however, the stator is constituted by a single stator portion. Accordingly, in order to determine the direction of rotation of the motor, the pole teeth of the stator, and the magnetic permeance or phase between magnetic poles of the rotor are necessary to be shifted properly. Alternatively, it is necessary to use any mechanical means to determined the direction of rotation of the motor. Such a motor is not therefore suitable for an equipment which requires high-speed rotation or high torque.

On the other hand, according to the two-phase PM-type stepping motor as the second example of prior art which has been developed to solve the problems in the first example of prior art, the torque and rotation speed can be improved on a large scale, but it has problems in the points as follows.

(1) The number of lead wires for the coil is large to be four, and it is necessary to use at least 8 transistors to constitute a driving circuit.

(2) When the step angle is set to be fine, it is necessary to form a number of pole teeth, thereby causing a problem in construction work.

(3) It is difficult to obtain high torque with a fine step angle.

(4) In a three-phase PM-type stepping motor disclosed in JP-A-1-259748, the phase angle of current is 60°, and there is a problem that it is impossible to perform drive of 120° current-conduction.

(5) In addition, when an multi-phase stepping motor according to the above prior art is provided as a 5-phase stepping motor by setting the number of stator cores n to be n=5, it is necessary to provide at least 10 lead-out terminals for the stator coil, and it is required to use at least 20 transistors to constitute a driving circuit.

Therefore, there arises a problem that the driving circuit is so complicated that the cost increases on a large scale.

It is therefore an object of the present invention to solve the foregoing problems, and to provide a multi-phase stepping motor in which the number of lead wires is reduced to simplify a driving circuit, while high torque can be outputted with a very fine step angle, and which can be manufactured at a low price.

SUMMARY OF THE INVENTION

In order to achieve the above object, according to a first aspect of the present invention, provided is a multi-phase PM-type stepping motor comprising: a rotor constituted by a cylindrical permanent magnet with N poles and S poles magnetized alternately on an outer circumferential surface of the rotor; stator cores having teeth arranged in opposition to the N poles or the S poles on the outer circumferential surface of the rotor through a predetermined air gap; and excitation coils wound in the stator cores and for magnetizing the stator cores to thereby rotate the rotor; wherein, when the number of the stator cores is represented by n (n is an odd number not smaller than 5), and the magnetization pitch angle of the permanent magnet is represented by P, the teeth of the stator cores are shifted from each other by an angle of 2P/n.

According to a second aspect of the present invention, in the multi-phase PM-type stepping motor according to the first aspect of the present invention, the stator coils wound in the n stator cores are connected so as to have n terminals, and (n−1) or n of the n stator coils are bipolar-driven simultaneously by a driving circuit constituted by 2n transistors.

According to a third aspect of the present invention, provided is a multi-phase PM-type stepping motor comprising: a rotor constituted by a cylindrical permanent magnet with N poles and S poles magnetized alternately on an outer circumferential surface of the rotor; stator cores having teeth arranged in opposition to the N poles or the S poles on the outer circumferential surface of the rotor through a predetermined air gap; and excitation coils wound in the stator cores for magnetizing the stator cores to thereby rotate the rotor; wherein, when the number of the stator cores is 5, and the magnetization pitch angle of the permanent magnet is represented by P, the teeth of the stator cores are shifted from each other by an angle of 2P/5.

According to a fourth aspect of the present invention, provided is a multi-phase PM-type stepping motor comprising a group of n rotators and a group of n stators (n being an odd number not smaller than 3 associated with the n rotors respectively and correspondingly); each of the rotors being constituted by a cylindrical permanent magnet with N poles and S poles magnetized alternately on an outer circumferential surface of the rotor; each of the stators being constituted by a stator core having teeth arranged in opposition to the N poles or the S poles on the outer circumferential surface of the associated rotor through a predetermined air gap, and an excitation coil wound in the stator core for magnetizing the stator core to thereby rotate the associated rotor; the n stators being stacked one on another at the same pitch; the rotors being stacked one on another with a relation that magnetic poles of the $m^{th}$ rotor are shifted from magnetic poles of the $(m-1)^{th}$ rotor by an angle of 2P/n (m being an integer not smaller than 2 and not larger than n) where P represents the magnetization pitch angle of the permanent magnet.

According to a fifth aspect of the present invention, in the multi-phase PM-type stepping motor according to the fourth aspect of the present invention, the stator coils wound in the n stator cores are connected so as to have n terminals, and (n−1) or n of the n stator coils are bipolar-driven simultaneously by a driving circuit constituted by 2n transistors.

According to a sixth aspect of the present invention, provided is a multi-phase PM-type stepping motor comprising 3 rotators and 3 stators associated with the 3 rotors respectively and correspondingly; each of the rotors being constituted by a cylindrical permanent magnet with N poles and S poles magnetized alternately on an outer circumferential surface of the rotor; each of the stators being constituted by a stator core having teeth arranged in opposition to the N poles or the S poles on the outer circumferential surface of the associated rotor through a predetermined air gap, and an excitation coil wound in the stator core for magnetizing the stator core to thereby rotate the associated rotor; the 3 stators being stacked one on another at the same pitch; the rotors being stacked one on another with a relation that magnetic poles of a second one of the rotors are shifted from magnetic poles of a first one of the rotors by an angle of 2P/3, and magnetic poles of a third one of rotors are shifted from magnetic poles of the second rotor by an angle of 2P/3, where P represents the magnetization pitch angle of the permanent magnet.

According to a seventh aspect of the present invention, provided is a multi-phase PM-type stepping motor comprising 5 rotators and 5 stators associated with the 5 rotors respectively and correspondingly; each of the rotors being constituted by a cylindrical permanent magnet with N poles and S poles magnetized alternately on an outer circumferential surface of the rotor; each of the stators being constituted by a stator core having teeth arranged in opposition to the N poles or the S poles on the outer circumferential surface of the associated rotor through a predetermined air gap, and an excitation coil wound in the stator core for magnetizing the stator core to thereby rotate the associated rotor; the 5 stators being stacked one on another at the same pitch; the rotors being stacked one on another with a relation that magnetic poles of a second one of the rotors are shifted from magnetic poles of a first one of the rotors by an angle of 2P/5, magnetic poles of a third one of the rotors are shifted from magnetic poles of the second rotor by an angle of 2P/5, magnetic poles of a fourth one of the rotors are shifted from magnetic poles of the third rotor by an angle of 2P/5, and magnetic poles of a fifth one of the rotors are shifted from magnetic poles of the fourth rotor by an angle of 2P/5, where P represents the magnetization pitch angle of the permanent magnet.

BRIEF DESCRIPTION OF THE DRAWINGS

FIG. 12 is a table showing the relationship among the number M of magnetic poles of a rotor, the pitch τr of the magnetic poles of the rotor, and the step angle θs;

FIG. 30 is a table showing the relationship among the number M of magnetic poles of a rotor, the pitch Tr of the magnetic poles of the rotor, and the step angle θs;

DETAILED DESCRIPTION OF THE PREFERRED EMBODIMENTS

First Embodiment

A first embodiment of the multi-phase PM-type stepping motor according to the present invention will be described with reference to FIGS. 1 to 12.

In this first embodiment, description will be made about the case in which the number n of stator cores used in the multi-phase PM-type stepping motor according to the present invention is set to 3, and a rotor is constituted by triganged first to third rotor portions.

First, a basic configuration of the multi-phase PM-type stepping motor of the first embodiment will be described with reference to FIGS. 1 to 3.

Figure 1:
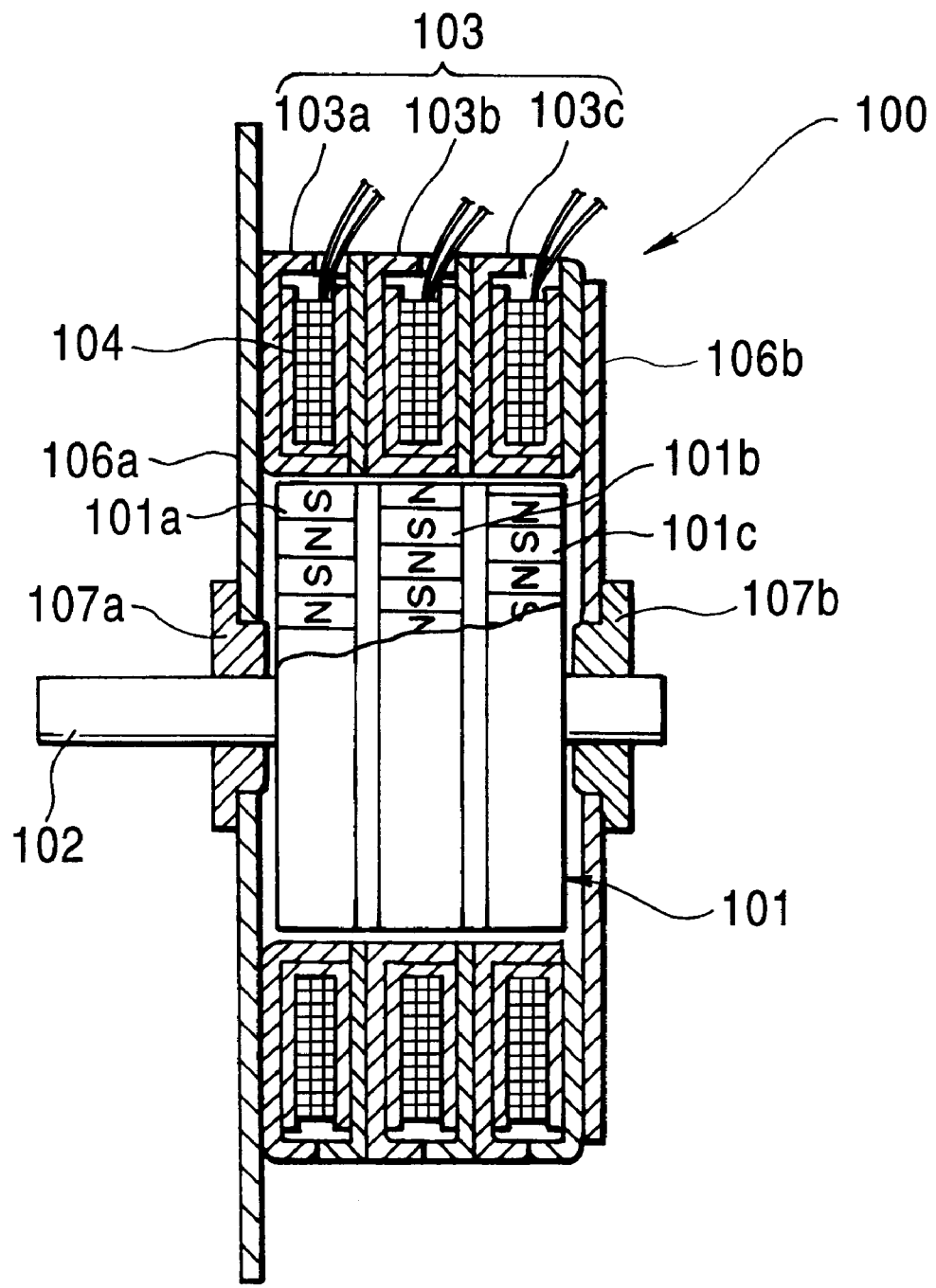
FIG. 1 is a vertically-sectioned side view of a multi-phase PM-type stepping motor of a first embodiment.
Figure 2:
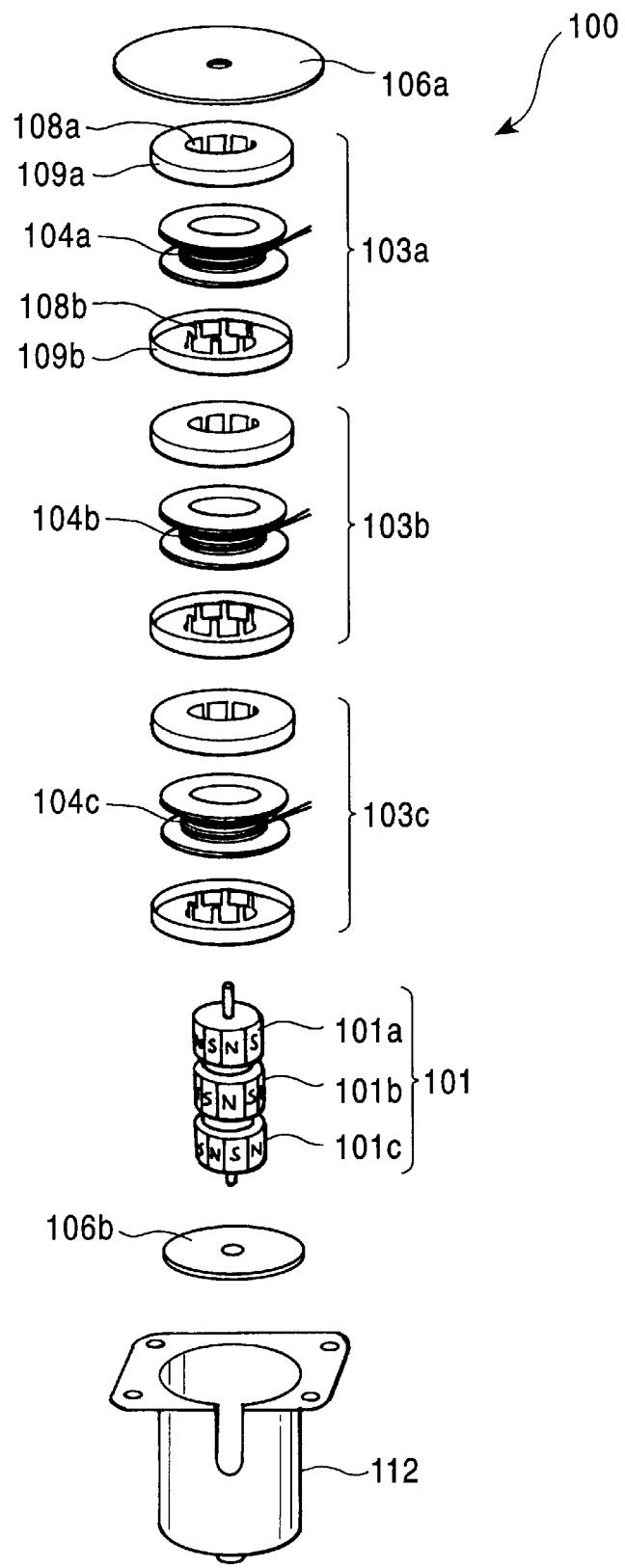
FIG. 2 is an exploded perspective view of the multi-phase PM-type stepping motor of the first embodiment.
Figure 3:
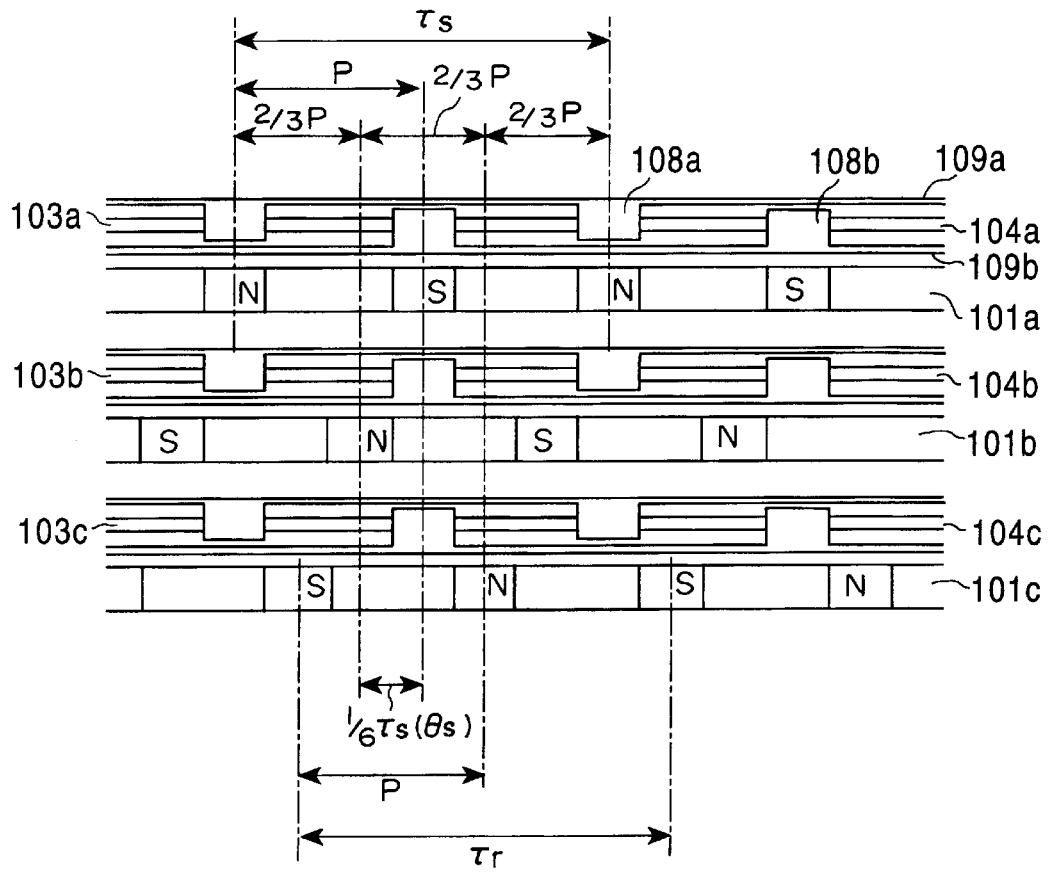
FIG. 3 is a development of the stator and rotor of the multi-phase PM-type stepping motor of the first embodiment.

FIG. 1 is a vertically-sectioned side view illustrating a multi-phase PM-type stepping motor 100 which is the first embodiment of the present invention, FIG. 2 is an exploded perspective view illustrating the multi-phase PM-type stepping motor 100, and FIG. 3 is a development of a stator 103 and a rotor 101 of the stepping motor 100.

In the multi-phase PM-type stepping motor 100 of the first embodiment, as shown in FIGS. 1 and 2, the stator 103 is constituted by three, first to third, stator portions 103a to 103c ganged together in the axial direction. The positions of respective comb-like pole teeth 108a and 108b of each of the stator portions 103a to 103c and N and S magnetic poles on the outer circumferential surface of each of rotor portions 101a to 101c of the rotor 101 are established in such a manner as shown in FIG. 3.

That is, when one or the other of the pole teeth 108a and 108b in each of the yoke elements 109a and 109b are arranged at a pole teeth pitch of τs, the other-side pole teeth 108b are shifted by τs/2 from the one-side pole teeth 108a in a circumferential direction in each of the stator portions 103a to 103c.

Further, the first to third stator portions 103a to 103c are ganged together so that the respective pole teeth 108a of the first to third stator portions 103a to 103c are aligned in the axial direction and the respective pole teeth 108b of the first to third stator portions 103a to 103c are aligned in the axial direction.

On the other hand, when the N and S poles of each of the rotor portions 101a to 101c of the rotor 101 are arranged at a pitch of τr respectively, the relation of τr=τs is established. Therefore, a distance P between N and S poles adjacent to each other is set so as to satisfy P=τr/2.

The magnetic poles of the first rotor portion 101a are shifted by 2P/3 from those of the second rotor portion 101b, and the magnetic poles of the second rotor portion 101b are shifted by 2P/3 from those of the third rotor portion 101c.

In FIG. 1, the reference numeral 102 represents a rotating shaft: 104, a stator coil; 106a and 106b, motor mounting plates; and 107a and 107b, bearings for the rotating shaft 102. In addition, in FIG. 2, the reference numeral 112 represents a motor housing.

The operation of the multi-phase PM-type stepping motor 100 of the first embodiment having such a configuration will be described with reference to FIGS. 4 to 12.

Figure 4:
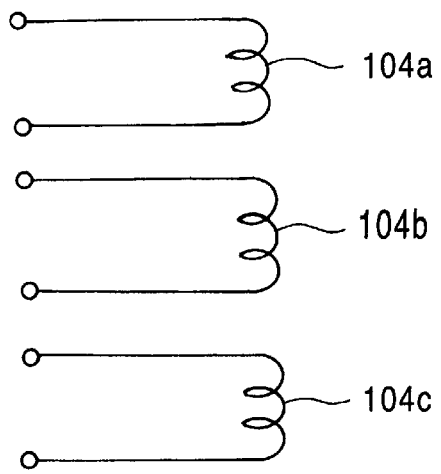
FIG. 4 is a simplified diagram of stator coils for explaining the operation of the multi-phase PM-type stepping motor of the first embodiment.
Figure 5:
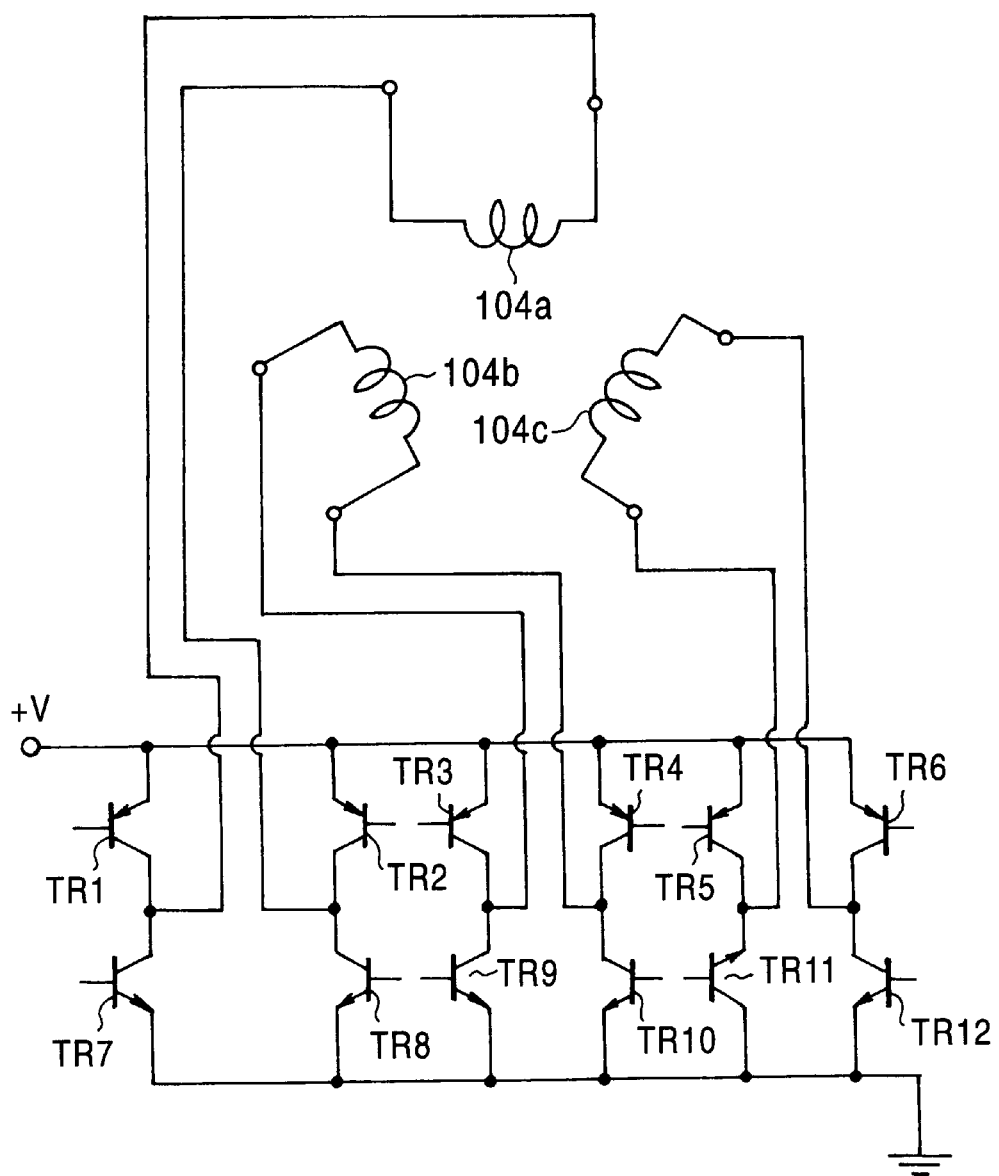
FIG. 5 is a simplified diagram of a stator coil driving circuit for explaining the operation of the multi-phase PM-type stepping motors of the first embodiment.
Figure 6:
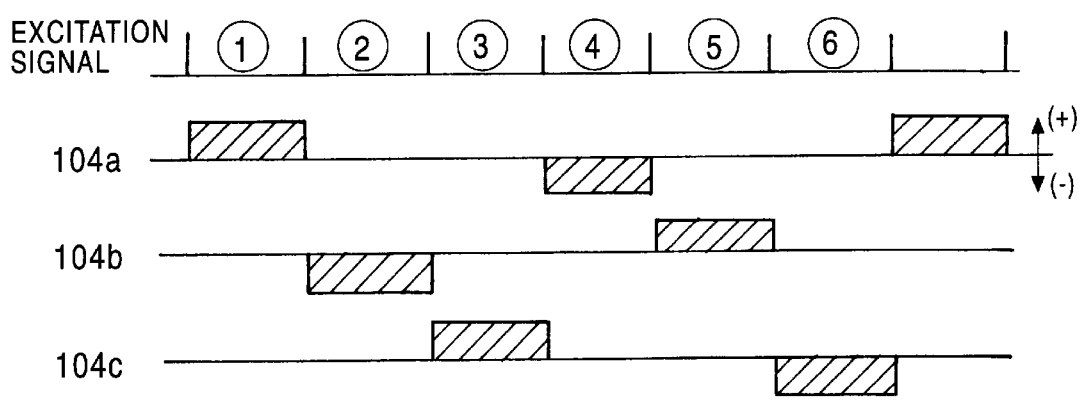
FIG. 6 is a simplified diagram illustrating a sequence of excitation of the stator coils for explaining the operation of the multi-phase PM-type stepping motors of the first embodiment.

FIG. 4 shows stator coils 104a to 104c formed of monofilament windings, and 6 external lead wires of those stator coils 104a to 104c. The stator coil 104 of FIG. 1 is a generic name of the stator coils 104a to 104c. FIG. 5 is a diagram of a driving circuit constituted by 6 PNP transistors TR1 to TR6 and 6 NPN transistors TR7 to TR12, for driving the stator coils 104a to 104c. FIG. 6 is a waveform diagram when the stator coils 104a to 104c are bipolar-driven by excitation signals ① to ⑥ sequentially by using the driving circuit of FIG. 5, for simply explaining the operation of the multi-phase PM-type stepping motor 100 according to the present invention.

As described above, in the first embodiment, three stator portions are piled up with the same pitch to form a triple-ganged stator structure. On the other hand, the rotor portions 101a, 101b and 101c of the rotor 101 are arranged such that, when the magnetization pitch angle of the permanent magnet is assumed to be P, the magnetic poles of the second rotor portion 101b are shifted by 2P/3 relative to the magnetic poles of the first rotor portion 101a, and the magnetic poles of the third rotor portion 101c are shifted by 2P/3 relative to the magnetic poles of the second rotor portion 101b.

Figure 7:
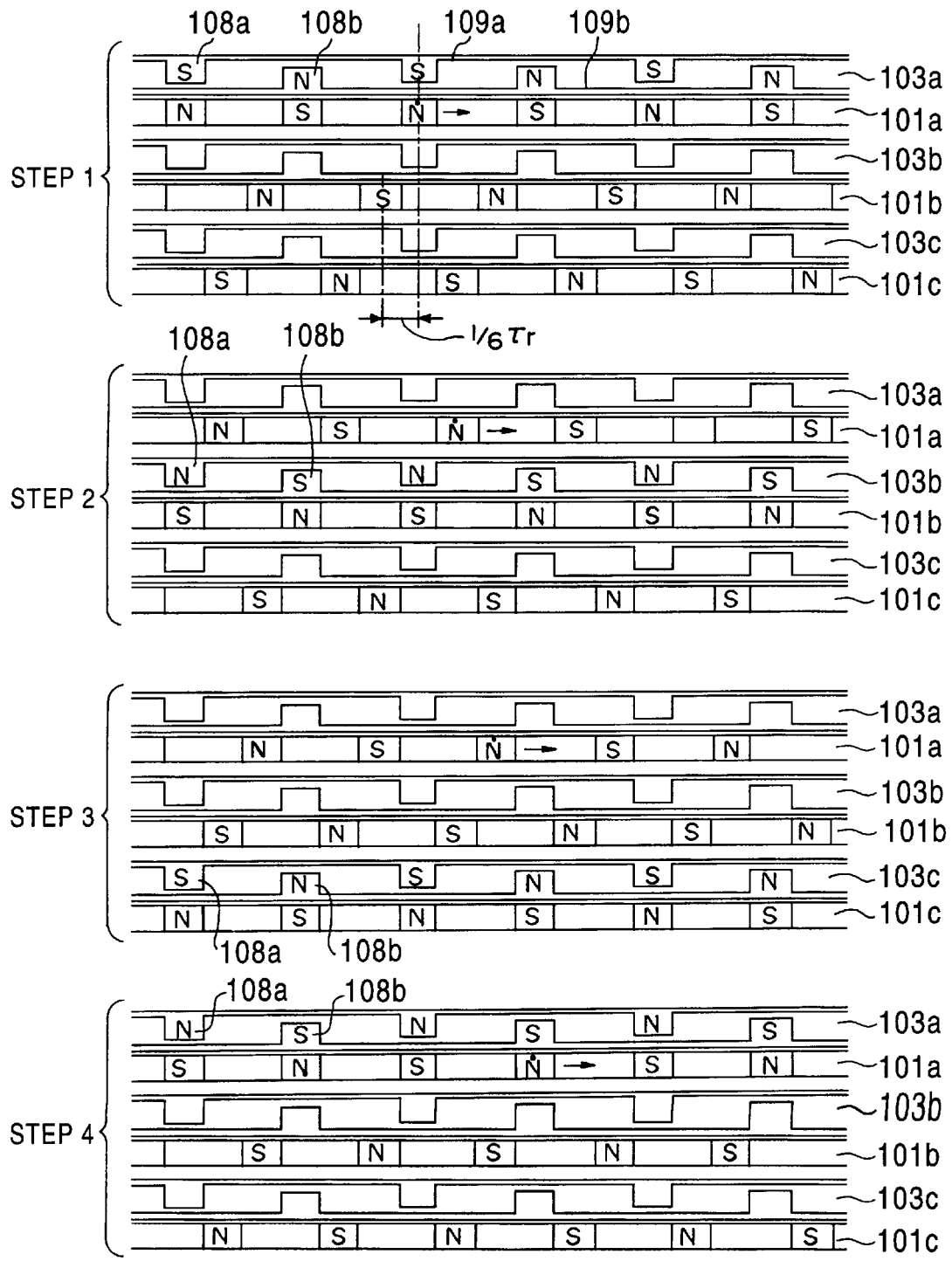
FIG. 7 is a simplified development of the pole teeth of the stator and magnetic poles of the rotor for explaining the operation of the multi-phase PM-type stepping motor of the first embodiment.

FIG. 7 shows the operation when the stator coils are successively bipolar-driven with the excitation of FIG. 6 by using the driving circuit of FIG. 5.

Step 1 in FIG. 7 shows the case where a current is made to flow only in the stator coil 104a so that all the one-side pole teeth 108a of the first stator portion 103a become S, while all the other-side pole teeth 108b of the first stator portion 103a become N. In this Step 1, therefore, the magnetic poles N of the first rotor portion 101a are attracted to S of the pole teeth 108a of the first stator portion 103a, while the magnetic poles S of the first rotor portion 101a are attracted to N of the pole teeth 108b of the first stator portion 103a so that the magnetic poles N of the first rotor portion 101a are aligned with S of the pole teeth 108a of the first stator portion 103a, while the magnetic poles S of the first rotor portion 101a are aligned with N of the pole teeth 108b of the first stator portion 103a respectively, as shown in FIG. 7.

Next, in Step 2 in FIG. 7, a current is made to flow in the stator coil 104b so that the one-side pole teeth 108a of the second stator portion 103b become N, while the other-side pole teeth 108b of the second stator portion 103b become S. As a result, the magnetic poles S and N of the second rotor portion 101b are attracted by, moved to, and aligned with N and S of the pole teeth 108a and 108b of the second stator portion 103b respectively. At this time, the magnetic poles of the rotor 101 move by τr/6.

Further, in Step 3 in FIG. 7, a current is made to flow in the stator coil 104c so that the one-side pole teeth 108a of the third stator portion 103c become S, while the other-side pole teeth 108b of the third stator portion 103c become N. As a result, the rotor 101 moves by one step so that the magnetic poles S and N of the third rotor portion 101c are attracted by, moved to, and aligned with N and S of the pole teeth 108b and 108a of the third stator portion 103c respectively.

In Steps 4, 5 and 6, the direction of the current made to flow in the stator coils 104a to 104c is reversed to that in Steps 1, 2 and 3 respectively, as shown in FIG. 6. In such a manner, the rotor 101 is moved in the direction shown by arrows, so that the rotor 101 returns, in Step 7, to the initial position of Step 1.

The step angle θs at this time is τr/6.

Next, the operation of the multi-phase PM-type stepping motor 100 of the first embodiment will be described specifically with reference to FIGS. 8 to 11.

Figure 8:
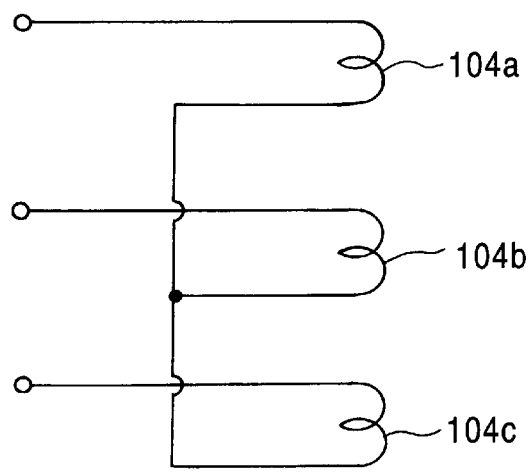
FIG. 8 is a diagram for explaining the stator coils of the multi-phase PM-type stepping motor of the first embodiment.
Figure 9:
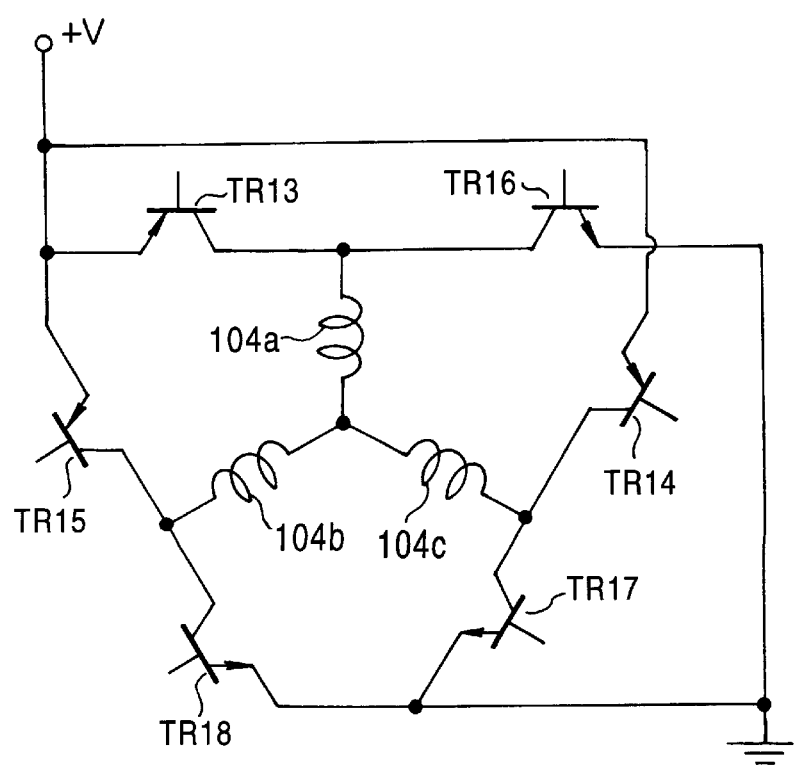
FIG. 9 is a diagram of a stator coil driving circuit in the multi-phase PM-type stepping motor of the first embodiment.
Figure 10:
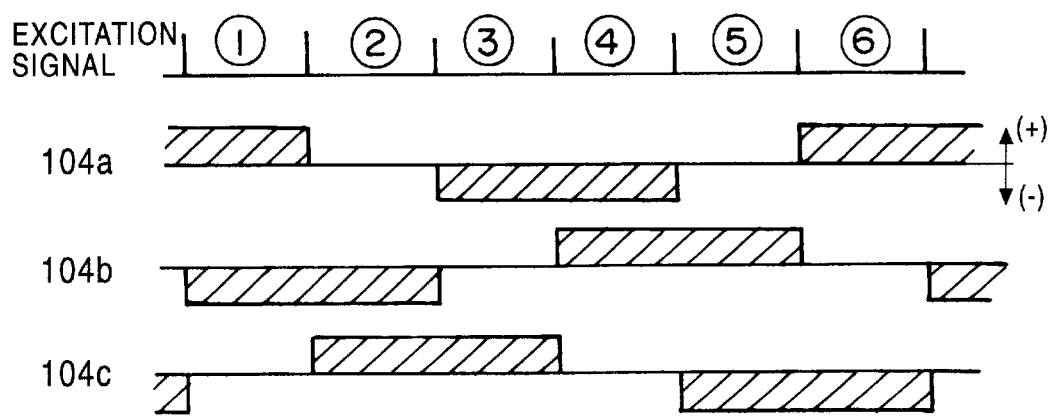
FIG. 10 is a diagram illustrating a sequence of excitation of the stator coils in the multi-phase PM-type stepping motor of the first embodiment.

Here, FIG. 8 is a diagram for explaining the stator coils 104a to 104c of the multi-phase PM-type stepping motor 100 of the first embodiment. FIG. 9 is a diagram of a stator coil driving circuit. FIG. 10 is a diagram illustrating an excitation sequence of the stator coils 104a to 104c.

Figure 11:
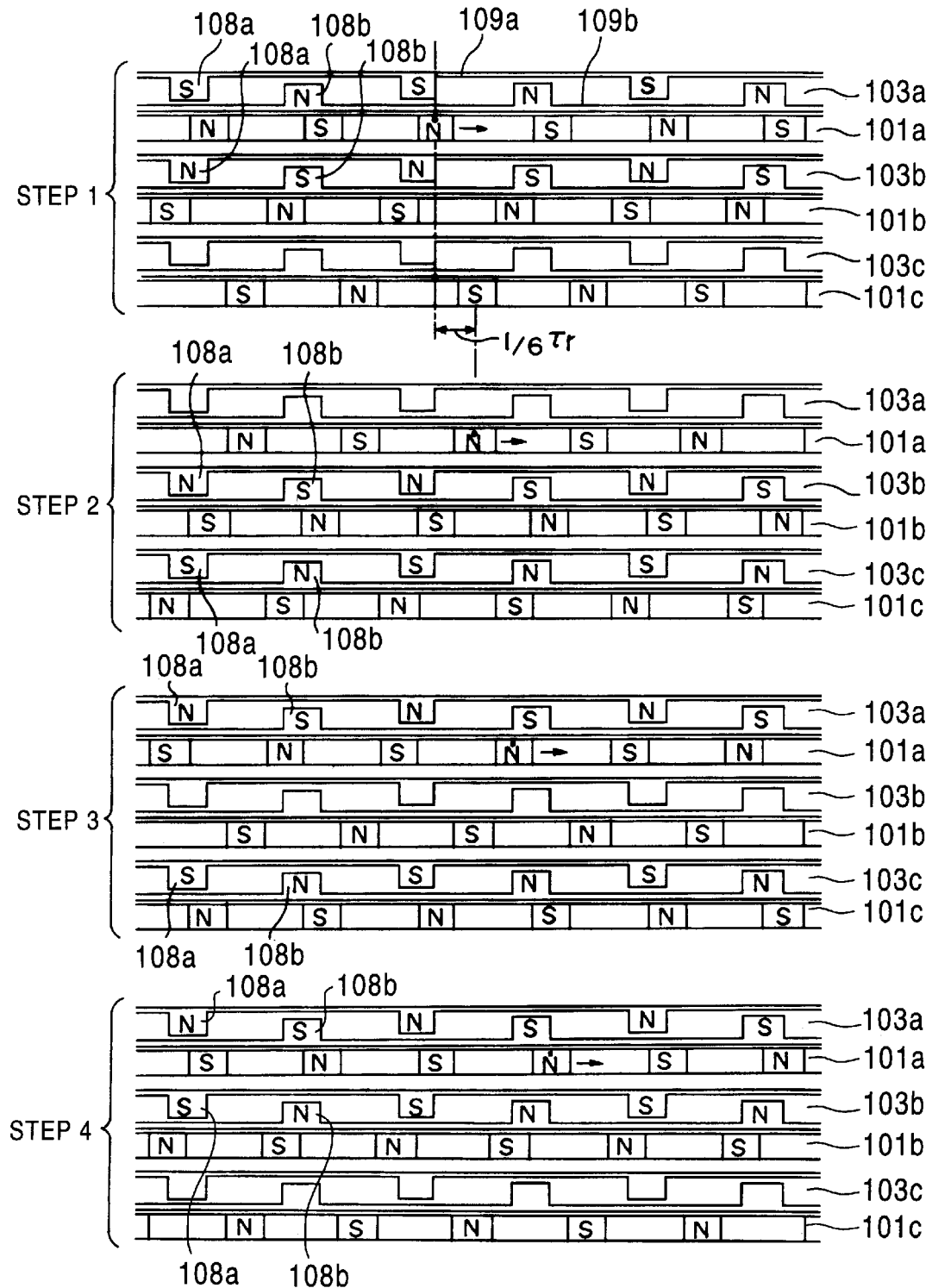
FIG. 11 is a simplified development of the pole teeth of the stator and the magnetic poles of the rotor for explaining the operation of the multi-phase PM-type stepping motor of the first embodiment.

Further, FIG. 11 is a development of the pole teeth 108a and 108b in each of the stator portions 103a to 103c and the magnetic poles of the first to third rotor portions 101a to 101c, for simply explaining the operation of the multi-phase PM-type stepping motor 100 of the first embodiment.

That is, FIG. 11 shows the operation when the stator coils are successively bipolar-driven with the excitation of FIG. 10 by using the driving circuit of FIG. 9.

In the first embodiment, as shown in FIG. 8, the stator coils 104a to 104c are connected in a star-connection so that the number of external lead wires is three. These lead wires are connected to a junction between a PNP transistor TR13 and an NPN transistor TR16 which are connected in series between a DC power source V and the ground, another junction between a PNP transistor TR14 and an NPN transistor TR17 which are also connected in series between the DC power source V and the ground, and a further junction between a PNP transistor TR15 and an NPN transistor TR18 which are also connected in series between the DC power source V and the ground, respectively, as shown in FIG. 9. Excitation signals ① to ⑥ as shown in FIG. 10 are applied to this stator coil driving circuit to thereby bipolar-drive the first to third stator coils 104a to 104c.

That is, in Step 1, as shown in FIG. 11, all the one-side pole teeth 108a of the first stator portion 103a and the other-side pole teeth 108b of the second stator portion 103b become S, while all the other-side pole teeth 108b of the first stator portion 103a and the one-side pole teeth 108a of the second stator portion 103b become N.

In Step 2, all the one-side pole teeth 108a of the second stator portion 103b and the other-side pole teeth 108b of the third stator portion 103c become N, while all the other-side pole teeth 108b of the second stator portion 103b and the one-side pole teeth 108a of the third stator portion 103c become S.

In Step 3, all the one-side pole teeth 108a of the third stator portion 103c and the other-side pole teeth 108b of the first stator portion 103a become S, while all the other-side pole teeth 108b of the third stator portion 103c and the one-side pole teeth 108a of the first stator portion 103a become N.

In Steps 4, 5 and 6, as shown in FIG. 10, the direction of the current flowing in the stator coils 104a to 104c are reversed to that in Steps 1, 2 and 3, respectively. That is, N and S in the Steps 4 to 6 are reversed to those in the steps 1 to 3. In Step 7, the state returns to that in Step 1.

The step angle Os in this embodiment is τr/6.

The table in FIG. 12 shows the relationship among the number of magnetic poles M in each of the rotor portions 101a to 101c, the magnetic pole pitch τr of the same, and the step angle θs.

Second Embodiment

A second embodiment of the multi-phase PM-type stepping motor according to the present invention will be described with reference to FIGS. 13 to 30.

In this second embodiment, description will be made about the case in which the number n of stator cores used in the multi-phase PM-type stepping motor according to the present invention is set to 5, and a rotor is used in the form of a single structure.

First, a basic configuration of the multi-phase PM-type stepping motor of the second embodiment will be described with reference to FIGS. 13 to 15.

Figure 13:
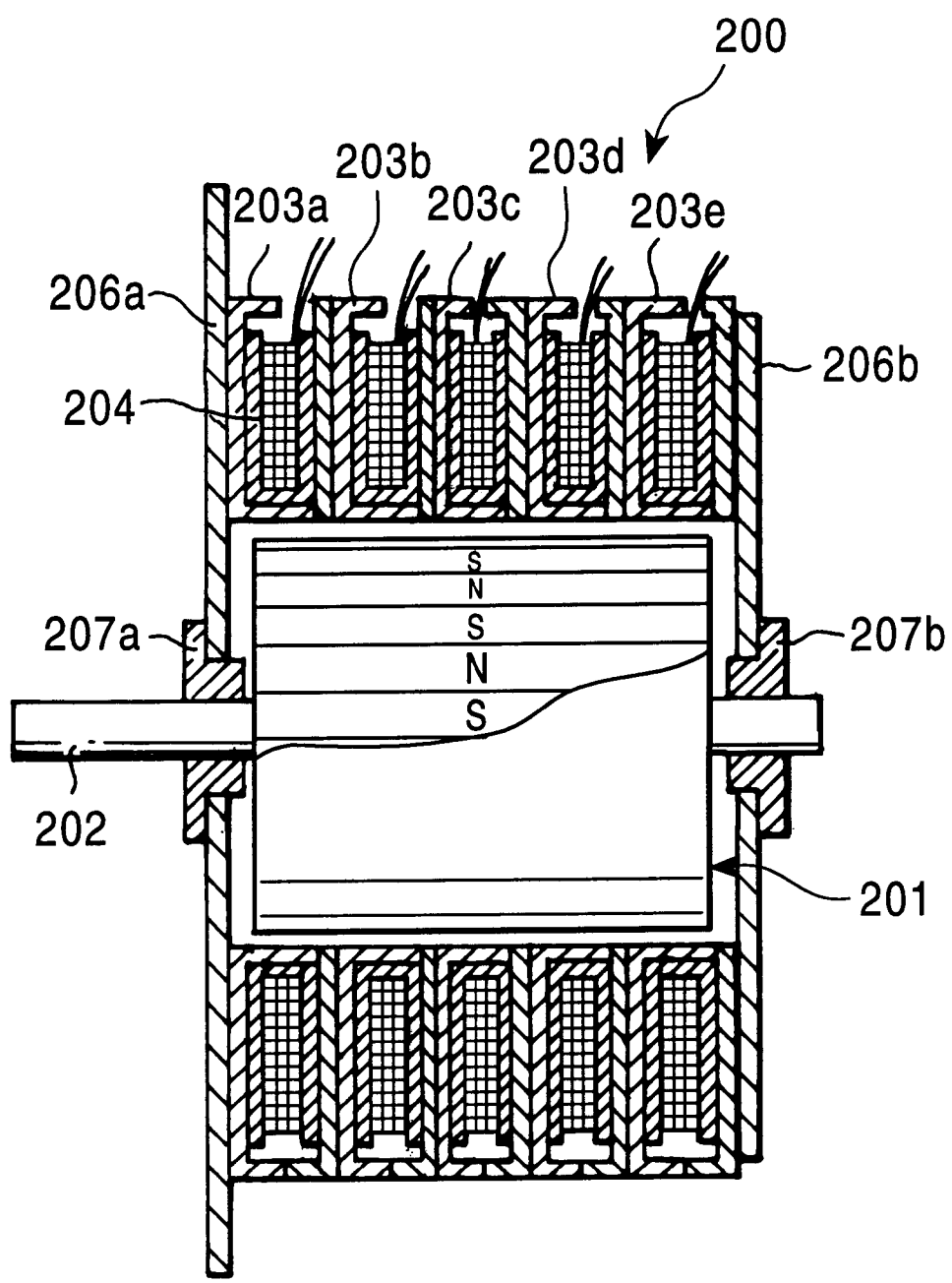
FIG. 13 is a vertically-sectioned side view of the multi-phase PM-type stepping motor of the second embodiment.
Figure 14:
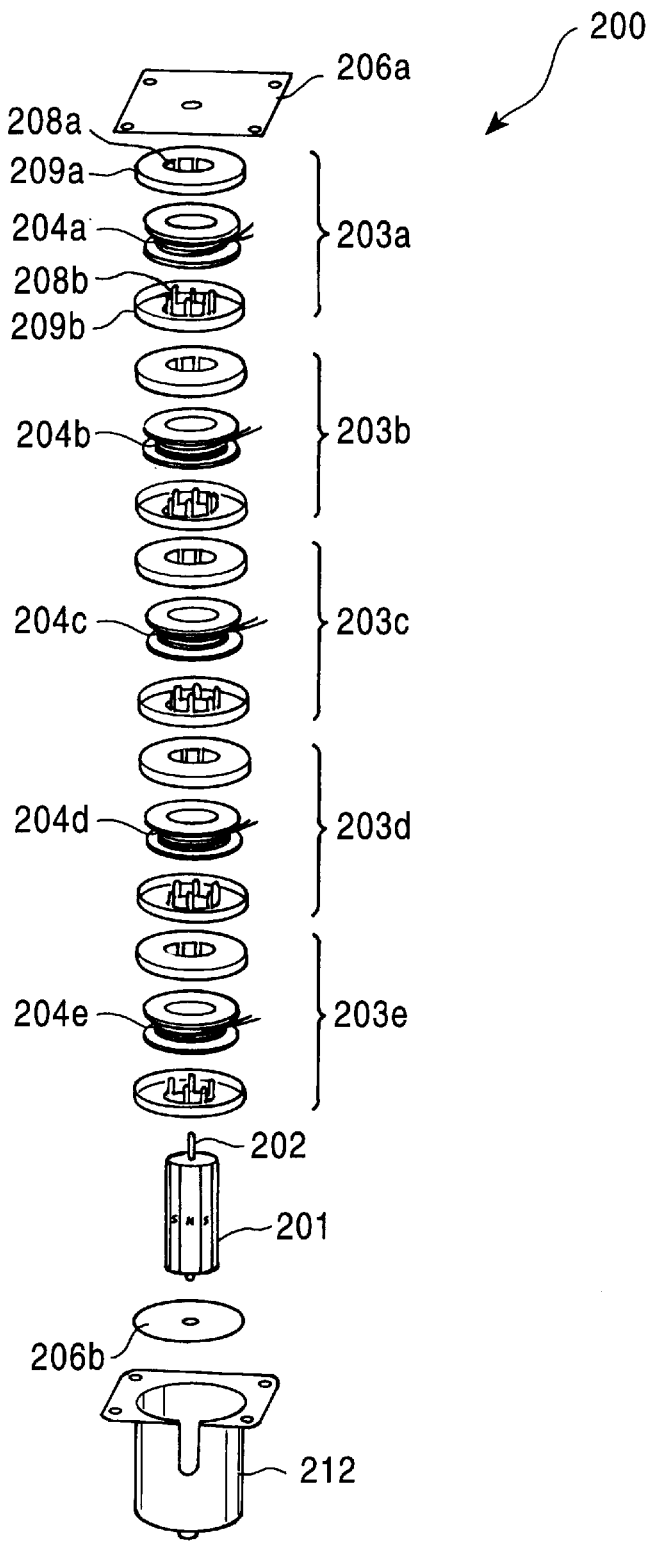
FIG. 14 is an exploded perspective view of the multi-phase PM-type stepping motor of the second embodiment.
Figure 15:
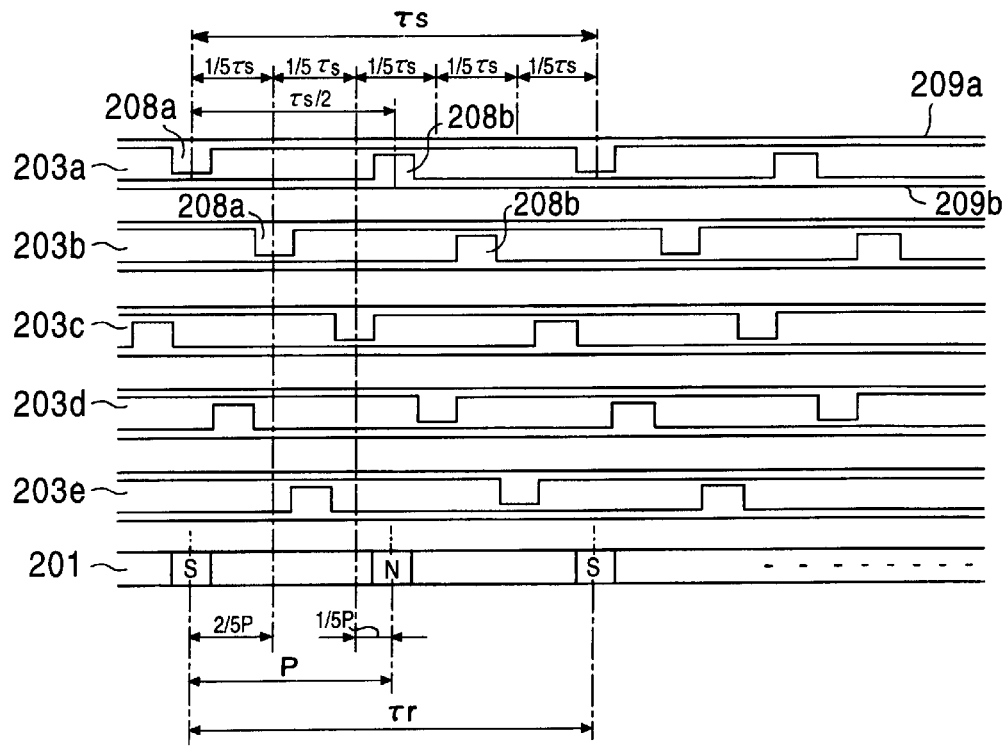
FIG. 15 is a development of the stator and rotor of the multi-phase PM-type stepping motor of the second embodiment.

FIG. 13 is a vertically-sectioned side view illustrating a multi-phase PM-type stepping motor 200 which is the second embodiment of the present invention, FIG. 14 is an exploded perspective view illustrating the multi-phase PM-type stepping motor 200, and FIG. 15 is a development of a stator 203 and a rotor 201 of the stepping motor 200.

In the multi-phase PM-type stepping motor 200 of the second embodiment, as shown in FIGS. 13 and 14, the stator 203 is constituted by five, first to fifth, stator portions 203a to 203e ganged in the axial direction. The positions of respective comblike pole teeth 208a and 208b of each of the stator portions 203a to 203e and N and S magnetic poles on the outer circumferential surface of the rotor 201 are established in such a manner as shown in FIG. 15.

That is, when one or the other of the pole teeth 208a and 208b in each of the yoke elements 209a and 209b are arranged at a pole teeth pitch of τs, the other-side pole teeth 208b are shifted by τs/2 from the one-side pole teeth 208a in a circumferential direction in each of the stator portions 203a to 203e.

Further, the one-side pole teeth 208a of the second stator portion 203b are shifted by τs/5 from the one-side pole teeth 208a of the first stator portion 203a.

Similarly, the one-side pole teeth 208a of the third stator portion 203c are shifted by τs/5 from the one-side pole teeth 208a of the second stator portion 203b.

Similarly, the one-side pole teeth 208a of the fourth stator portion 203d are shifted by τs/5 from the one-side pole teeth 208a of the third stator portion 203c.

Similarly, the one-side pole teeth 208a of the fifth stator portion 203e are shifted by τs/5 from the one-side pole teeth 208a of the fourth stator portion 203d.

In addition, when the N and S poles of the rotor 201 are arranged at a pitch τr respectively, the relation of τr=τs is established. Therefore, a distance P between N and S poles adjacent to each other is set so as to satisfy P=τr/2.

In FIG. 13, the reference numeral 202 represents a rotating shaft; 904, a stator coil; 206a and 206b, motor mounting plates; and 207a and 207b, bearings for the rotating shaft 202. In addition, in FIG. 14, the reference numeral 212 represents a motor housing.

The operation of the multi-phase PM-type stepping motor 200 of the second embodiment having such a configuration will be described with reference to FIGS. 16 to 27.

Figure 16:
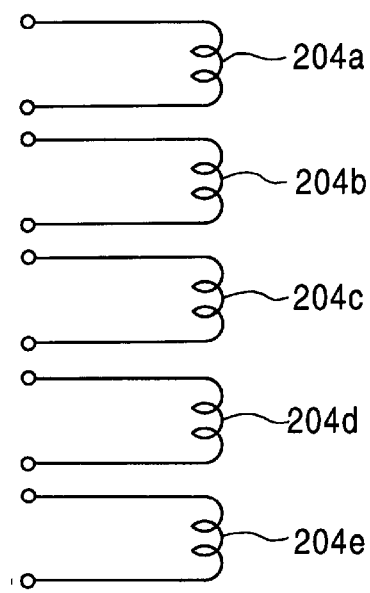
FIG. 16 is a simplified diagram of stator coils for explaining the operation of the multi-phase PM-type stepping motor of the second embodiment.
Figure 17:
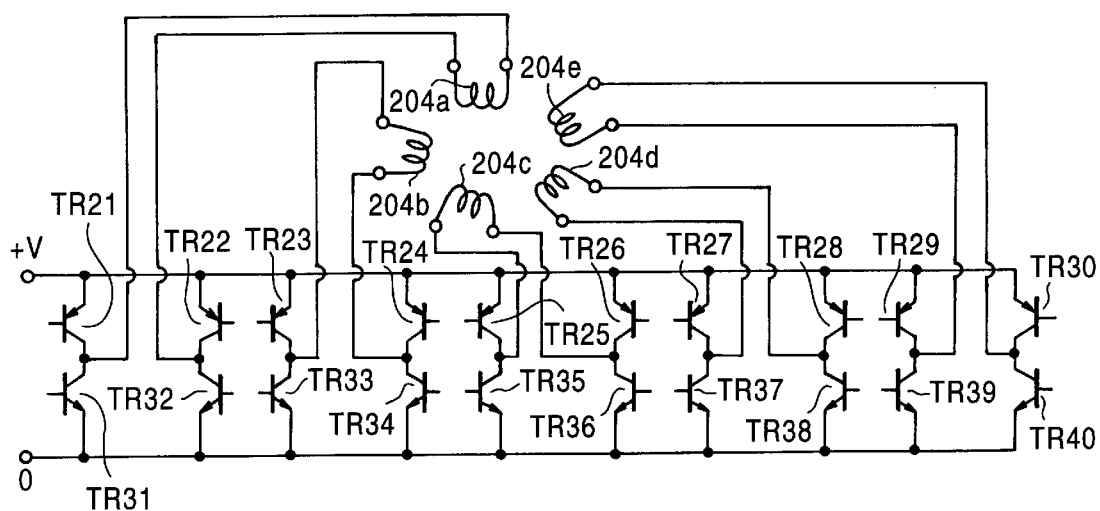
FIG. 17 is a simplified diagram of a stator coil driving circuit for explaining the operation of the multi-phase PM-type stepping motor of the second embodiment.
Figure 18:
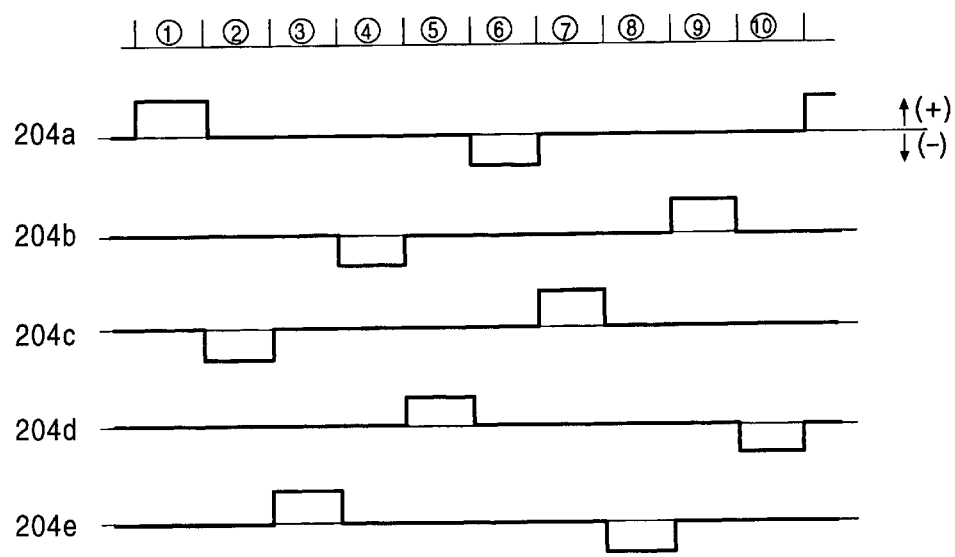
FIG. 18 is a simplified diagram illustrating a sequence of excitation of the stator coils for explaining the operation of the multi-phase PM-type stepping motor of the second embodiment.

FIG. 16 shows stator coils 204a to 204e formed of monofilament windings, and 10 external lead wires of those stator coils 204a to 204e. The stator coil 204 of FIG. 13 is a generic name of the stator coils 204a to 204e. FIG. 17 is a diagram of a driving circuit constituted by 10 PNP transistors TR21 to TR30 and 10 NPN transistors TR31 to TR40, for driving the stator coils 204a to 204e. FIG. 18 is a waveform diagram when the stator coils 204a to 204e are bipolar-driven by excitation signals ① to ⑩ sequentially by using the driving circuit of FIG. 17, for simply explaining the operation of the multi-phase PM-type stepping motor 200 of the second embodiment according to the present invention.

Figure 19:
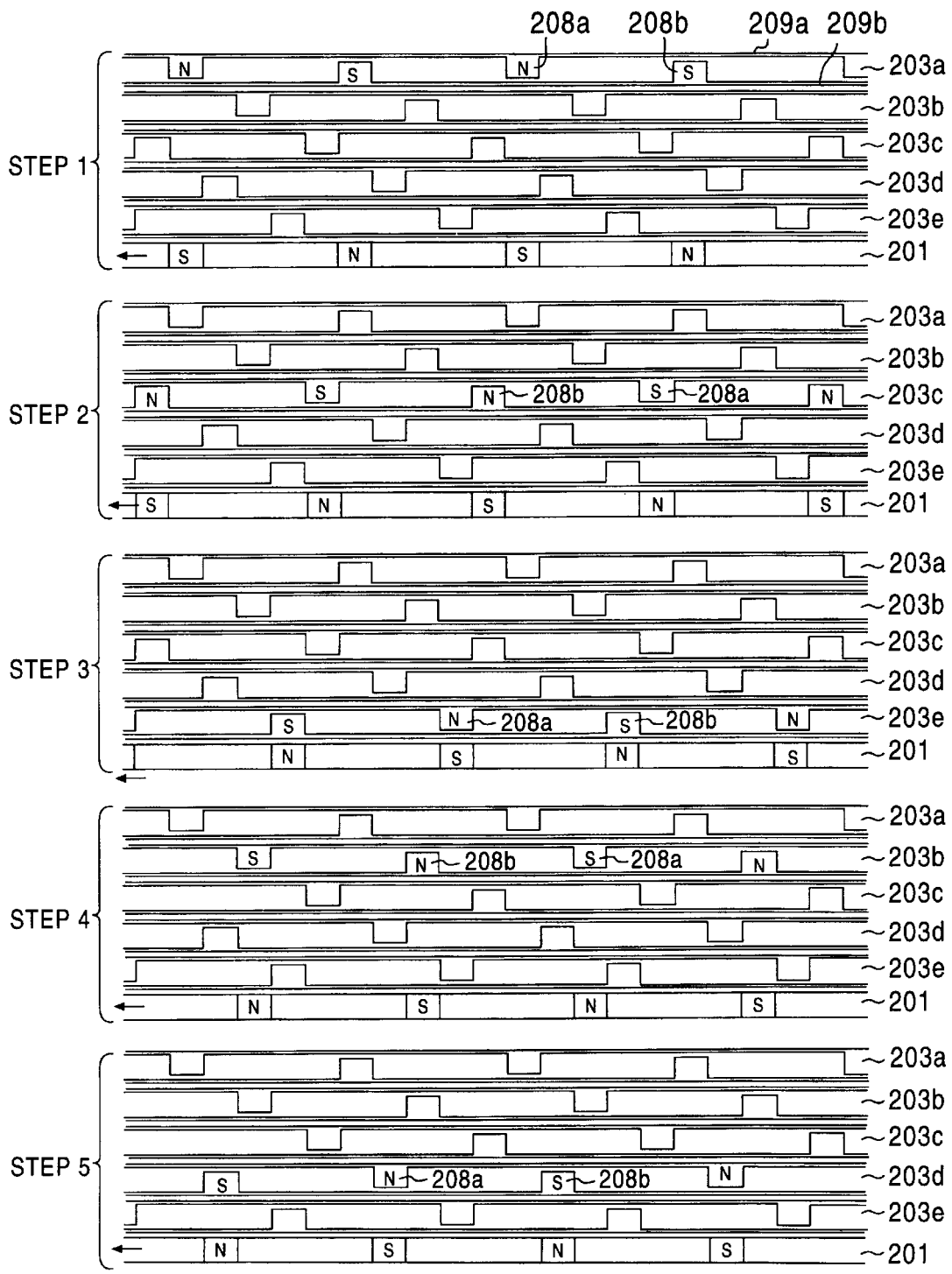
FIG. 19 is a simplified development of the pole teeth of the stator and magnetic poles of the rotor for explaining the operation of the multi-phase PM-type stepping motor of the second embodiment.

Further, FIG. 19 is a development of the pole teeth 208a and 208b in each of the stator portions 203a to 203e and magnetic poles of the rotor 201 for simply explaining the operation of the multi-phase PM-type stepping motor 200 according to the present invention.

Step 1 in FIG. 19 shows the case where a current is made to flow only in the stator coil 204a so that all the one-side pole teeth 208a of the first stator portion 203a become N, while all the other-side pole teeth 208b of the first stator portion 203a become S. In this Step 1, therefore, the magnetic poles S of the rotor 201 are attracted to N of the pole teeth 208a of the first stator portion 203a, while the magnetic poles N of the rotor 201 are attracted to S of the pole teeth 208b of the first stator portion 203a so that the magnetic poles S of the rotor 201 are aligned with N of the pole teeth 208a of the first stator portion 203a, while the magnetic poles N of the rotor 201 are aligned with S of the pole teeth 208b of the first stator portion 203a, respectively, as shown in FIG. 19.

Next, in Step 2 in FIG. 19, a current is made to flow only in the stator coil 204c so that the one-side pole teeth 208a of the third stator portion 203c become S, while the other-side pole teeth 208b of the third stator portion 203c become N. As a result, the magnetic poles N and S of the rotor 201 are attracted by, moved to and aligned with S and N of the pole teeth 208a and 208b of the third stator portion 203c, respectively. At this time, the magnetic poles of the rotor 201 move by τr/10.

Further, in Step 3 in FIG. 19, a current is made to flow only in the stator coil 204e so that all the one-side pole teeth 208a of the fifth stator portion 203e become N, while all the other-side pole teeth 208b of the fifth stator portion 203e become S. As a result, the rotor 201 is moved by one step so that the magnetic poles S and N of the rotor 201 are attracted by, moved to, and aligned with N and S of the pole teeth 208a and 208b of the fifth stator portion 203e, respectively.

Further, in Step 4 in FIG. 19, a current is made to flow only in the stator coil 204b so that all the one-side pole teeth 208a of the second stator portion 203b become S, while all the other-side pole teeth 208b of the second stator portion 203b become N. As a result, the magnetic poles S and N of the rotor 201 are attracted by, moved to, and aligned with N and S of the pole teeth 208a and 208b of the second stator portion 203b, respectively.

Further, in Step 5 in FIG. 19, a current is made to flow only in the stator coil 204d so that all the one-side pole teeth 208a of the fourth stator portion 203d become S, while all the other-side pole teeth 208b of the fourth stator portion 203d become N. As a result, the magnetic poles N and S of the rotor 201 are attracted by, moved to, and aligned with S and N of the pole teeth 208a and 208b of the fourth stator portion 203d, respectively.

In Steps 6, 7, 8, 9 and 10, the direction of the current made to flow in the stator coils 204a to 204e is reversed to that in Steps 1, 2, 3, 4 and 5 respectively, as shown in FIG. 18. In such a manner, the rotor 201 is moved in the direction of arrows, so that the rotor 201 returns, in Step 11, to the initial position of Step 1. The step angle θs at this time is τr/10.

Next, the operation of the multi-phase PM-type stepping motor 200 of the second embodiment will be described specifically with reference to FIGS. 20 to 27.

Figure 20:
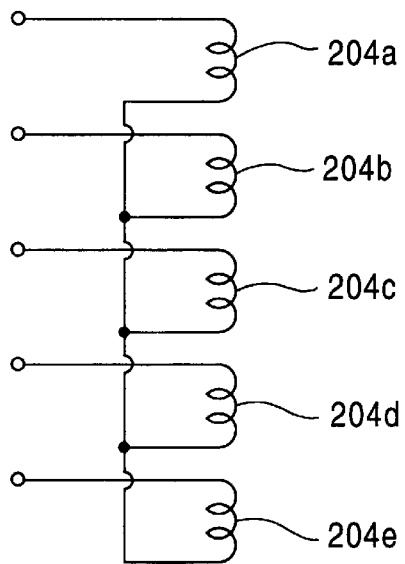
FIG. 20 is a diagram for explaining stator coils of the multi-phase PM-type stepping motor of the second embodiment.
Figure 21:
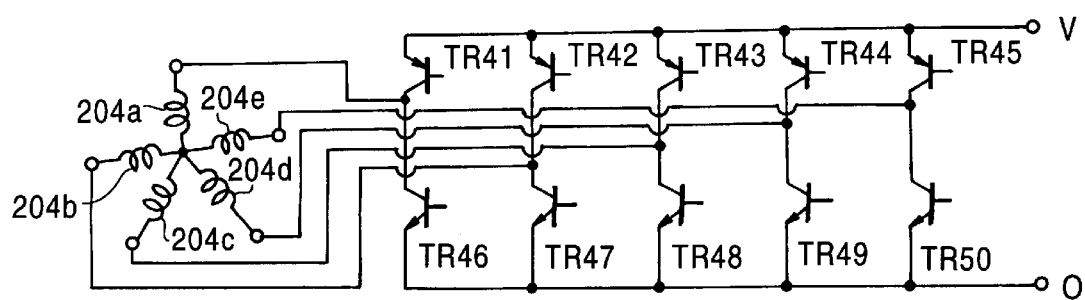
FIG. 21 is a diagram of a stator coil driving circuit in the multi-phase PM-type stepping motor of the second embodiment.
Figure 22:
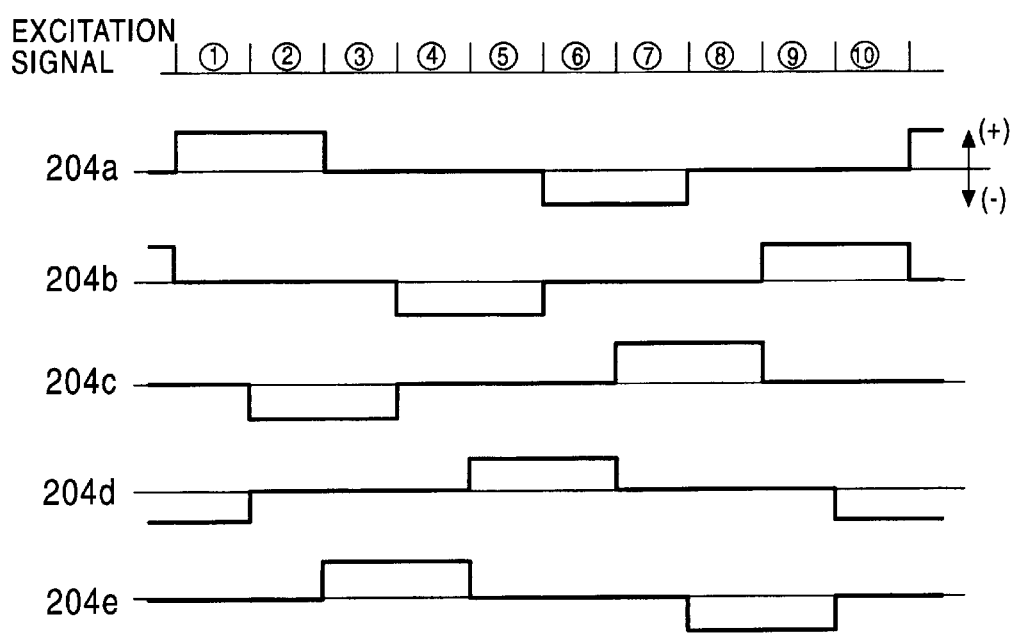
FIG. 22 is a diagram illustrating a sequence of excitation of the stator coils in the multi-phase PM-type stepping motor of the second embodiment.

Here, FIG. 20 is a diagram for explaining the stator coils 204a to 204e of the multi-phase PM-type stepping motor 200 of the second embodiment. FIG. 21 is a diagram of a stator coil driving circuit. FIG. 22 is a diagram illustrating an excitation sequence of the stator coils 204a to 204e.

Figure 23:
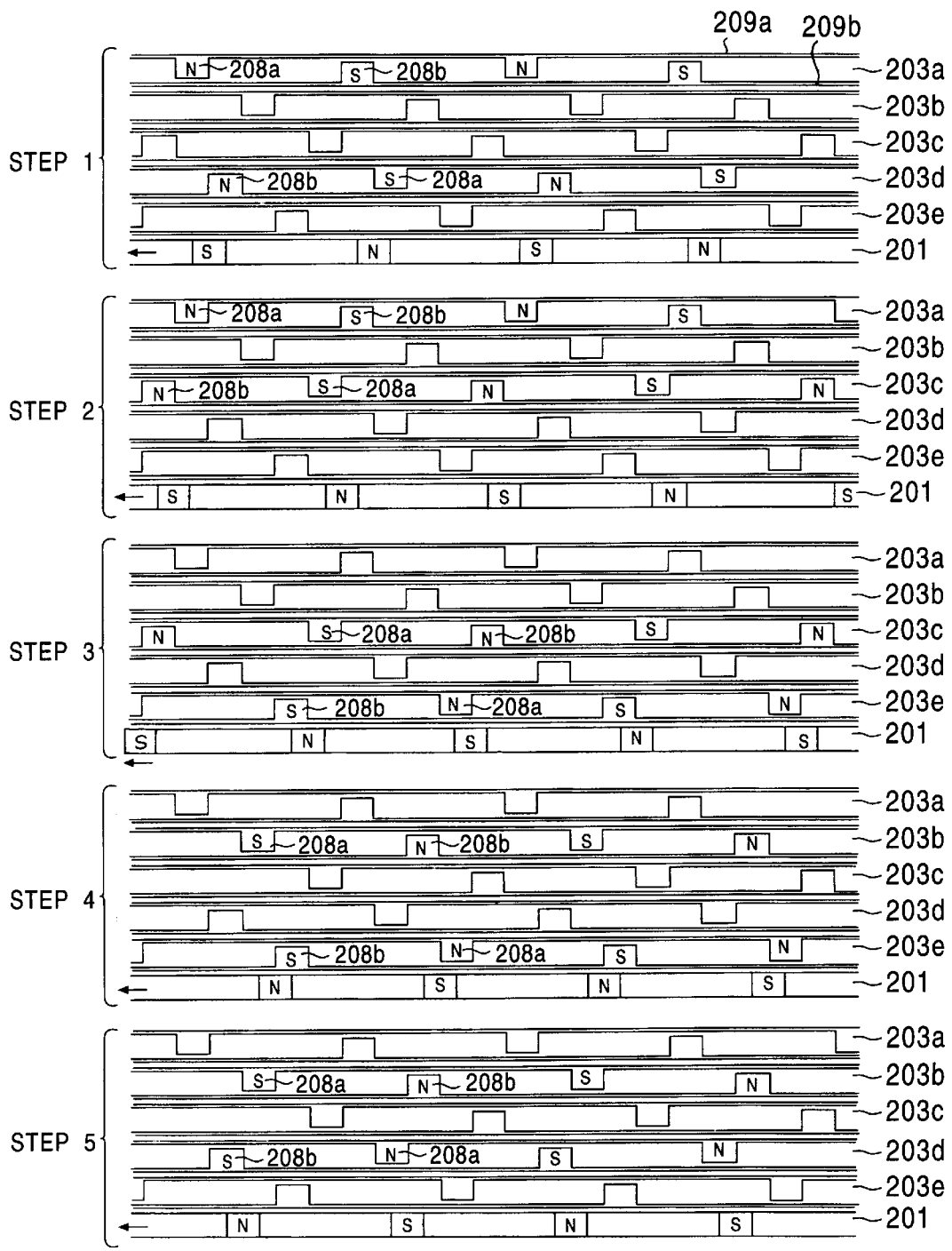
FIG. 23 is a simplified development of the pole teeth of the stator and the magnetic poles of the rotor for explaining the operation of the multi-phase PM-type stepping motor of the second embodiment.

Further, FIG. 23 is a development of the pole teeth 208a and 208b in each of the stator portions 203a to 203e and the magnetic poles of the rotor 201, for simply explaining the operation of the multi-phase PM-type stepping motor 200 of the second embodiment.

In the second embodiment, as shown in FIG. 20, the stator coils 204a to 204e are connected in a star-connection so that the number of external lead wires is five. These lead wires are connected to a junction between a PNP transistor TR41 and an NPN transistor TR46 which are connected in series between a DC power source V and the ground, another junction between a PNP transistor TR42 and an NPN transistor TR47 which are also connected in series between the DC power source V and the ground, and a further junction between a PNP transistor TR43 and an NPN transistor TR48 which are also connected in series between the DC power source V and the ground, a still further junction between a PNP transistor TR44 and an NPN transistor TR49 which are also connected in series between the DC power source V and the ground, and a further junction between a PNP transistor TR45 and an NPN transistor TR50 which are also connected in series between the DC power source V and the ground, respectively, as shown in FIG. 21. Excitation signals ① to ⑩ as shown in FIG. 22 are applied to this stator coil driving circuit to thereby bipolar-drive the first to fifth stator coils 204a to 204e.

That is, in Step 1, as shown in FIG. 23, all the one-side pole teeth 208a of the first stator portion 203a and the other-side pole teeth 208b of the fourth stator portion 203d are made to become N, while all the other-side pole teeth 208b of the first stator portion 203a and the one-side pole teeth 208a of the fourth stator portion 203d are made to become S.

In Step 2, the one-side pole teeth 208a of the third stator portion 203c are made to become S and the other-side pole teeth 208b of the third stator portion 203c are made to become N, while the one-side pole teeth 208a and the other-side pole teeth 208b of the first stator portion 203a are kept in N and S respectively.

In Step 3, the one-side pole teeth 208a of the fifth stator portion 203e are made to become N and the other-side pole teeth 208b of the fifth stator portion 203e are made to become S, while the one-side pole teeth 208a and the other-side pole teeth 208b of the third stator portion 203c are kept in S and N respectively.

In Step 4, the one-side pole teeth 208a of the second stator portion 203b are made to become S and the other-side pole teeth 208b of the second stator portion 203b are made to become N, while the one-side pole teeth 208a and the other-side pole teeth 208b of the fifth stator portion 203e are kept in N and S respectively.

In Step 5, the one-side pole teeth 208a of the fourth stator portion 203d are made to become N and the other-side pole teeth 208b of the fourth stator portion 203d are made to become S, while the one-side pole teeth 208a and the other-side pole teeth 208b of the second stator portion 203b are kept in S and N respectively.

Figure 24:
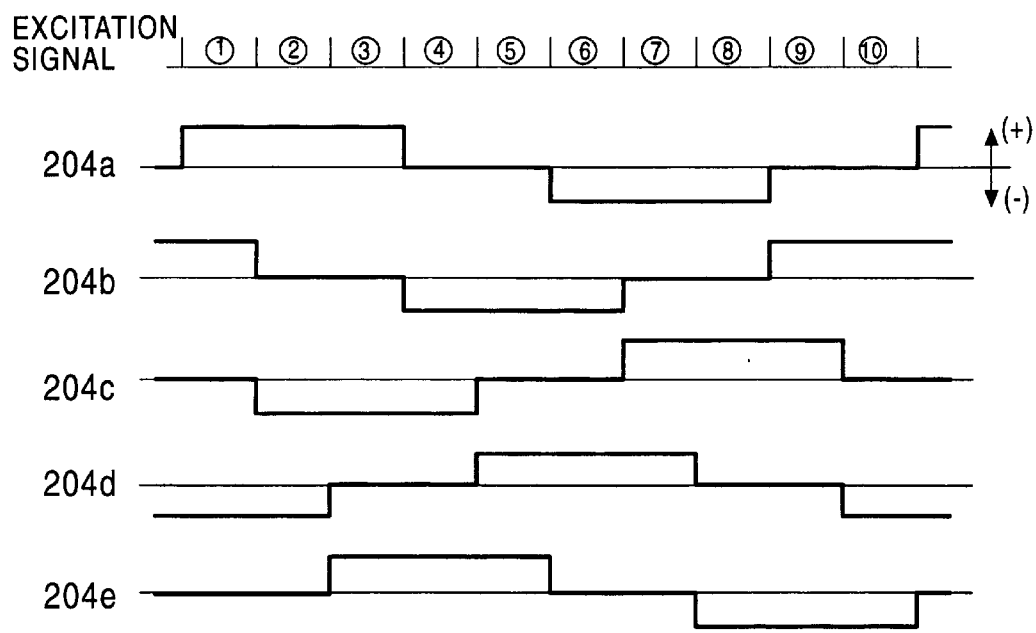
FIG. 24 is a diagram illustrating a 3-phase excitation sequence of the multi-phase PM-type stepping motor of the second embodiment.

In Steps 6, 7, 8, 9 and 10, as shown in FIG. 24, the direction of the current made to flow in the stator coils 204a to 204e is reversed to that in Steps 1, 2, 3, 4 and 5 respectively to thereby make the N and S reverse to those in the steps 1 to 5. The state returns, in Step 11, to Step 1.

The step angle θs in this embodiment is τr/10.

Figure 25:
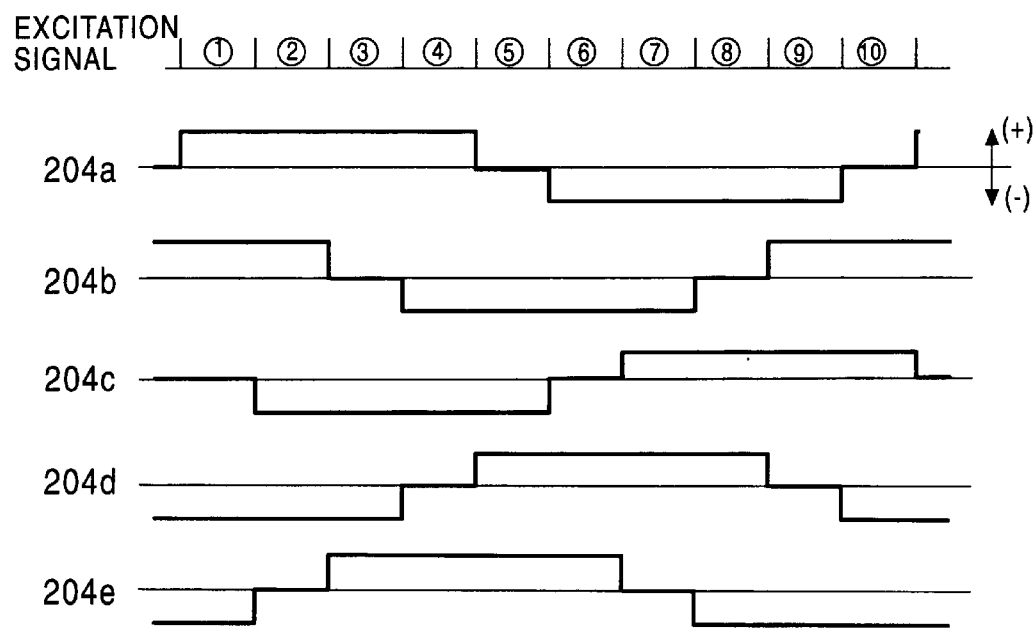
FIG. 25 is a diagram illustrating a 4-phase excitation sequence of the multi-phase PM-type stepping motor of the second embodiment.
Figure 26:
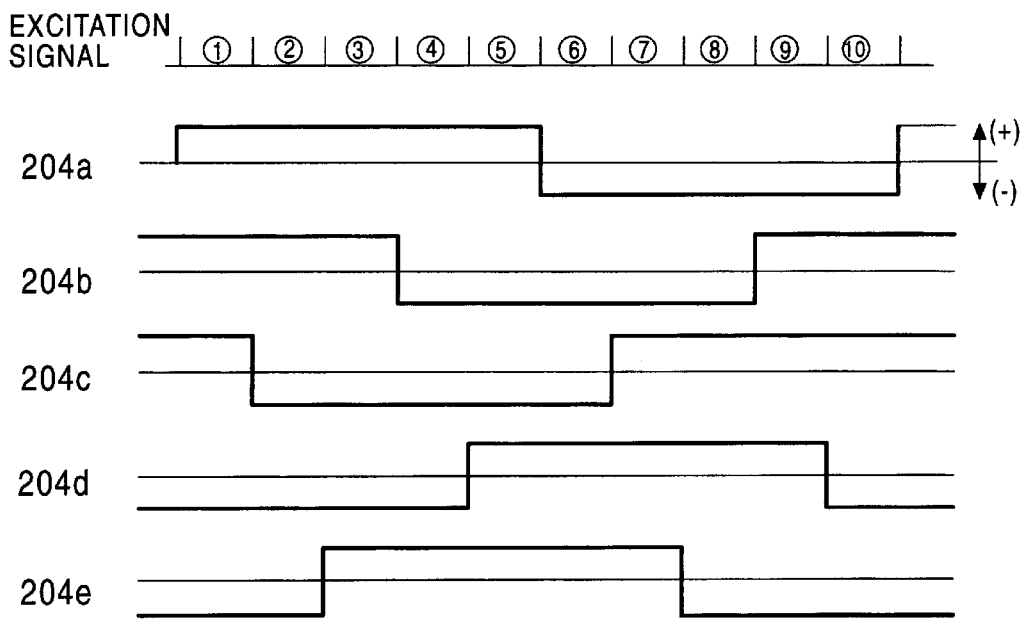
FIG. 26 is a diagram illustrating a 5-phase excitation sequence of the multi-phase PM-type stepping motor of the second embodiment.
Figure 27:
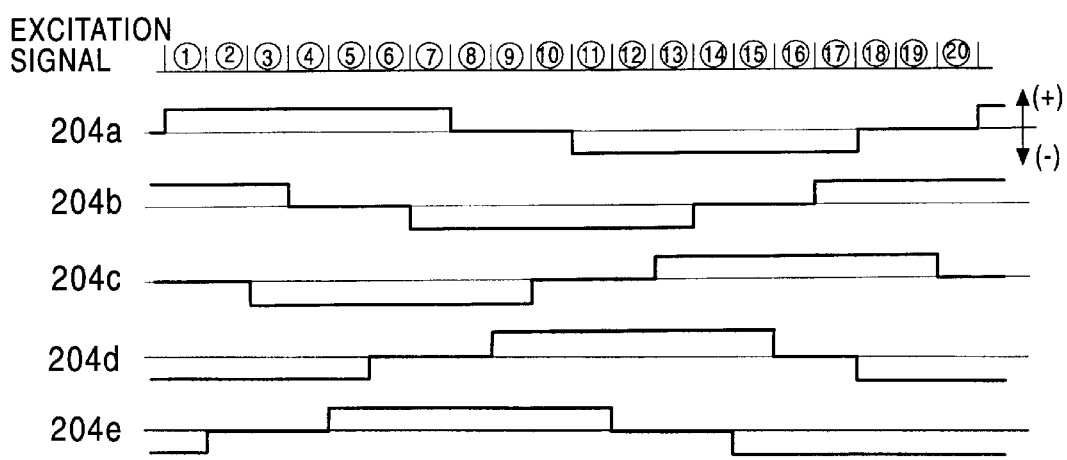
FIG. 27 is a diagram illustrating a 2-to-3-phase excitation sequence of the multi-phase PM-type stepping motor of the second embodiment.
Figure 28:
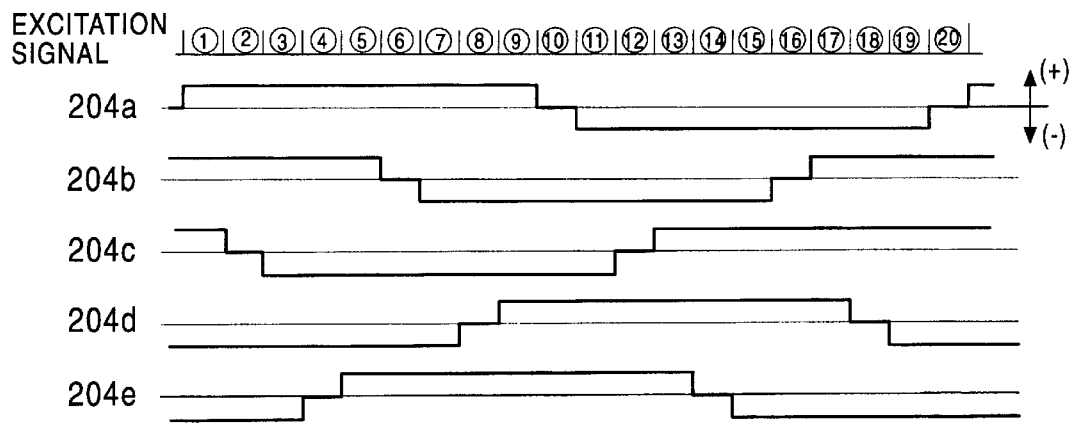
FIG. 28 is a diagram illustrating a 3-to-4-phase excitation sequence of the multi-phase PM-type stepping motor of the second embodiment.
Figure 29:
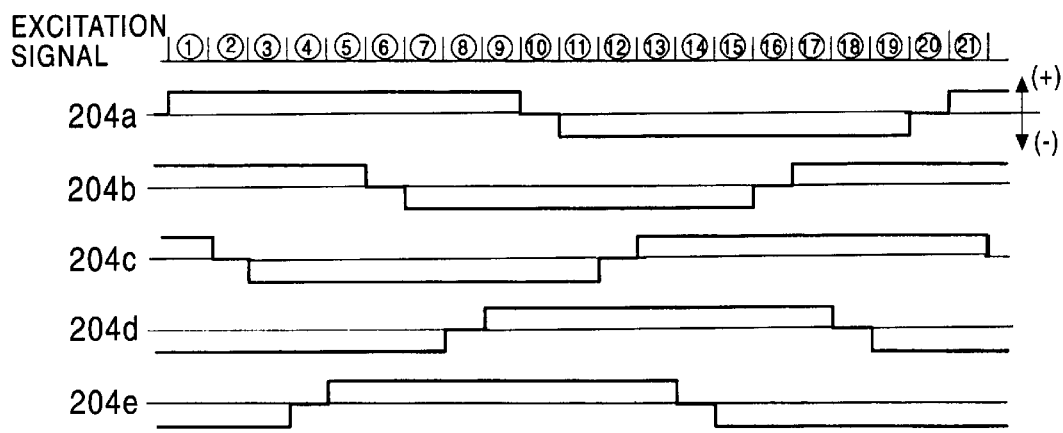
FIG. 29 is a diagram illustrating a 4-to-5-phase excitation sequence of the multi-phase PM-type stepping motor of the second embodiment.

FIGS. 24, 25 and 26 show sequence diagrams of three-phase excitation, four-phase excitation, and five-phase excitation, respectively, in the case of full-step operation, while FIGS. 27, 28 and 29 show sequence diagrams in the case of half-step operation. Since the operation of FIG. 23 applies similarly, the description about FIGS. 24 to 29 are omitted here.

The table in FIG. 30 shows the relationship among the number of magnetic poles M of the rotor 201, the magnetic pole pitch τr of the rotor 201, and the step angle θs.

Third Embodiment

A third embodiment of the multi-phase PM-type stepping motor according to the present invention will be described by using FIGS. 31 to 33 and with reference to FIG. 18.

In this third embodiment, description will be made about the case in which the number n of stator cores used in the multi-phase PM-type stepping motor according to the present invention is set to 5, and a rotor is constituted by penta-ganged first to fifth rotor portions.

First, a basic configuration of the multi-phase PM-type stepping motor of the third embodiment will be described with reference to FIGS. 31 to 33.

Figure 31:
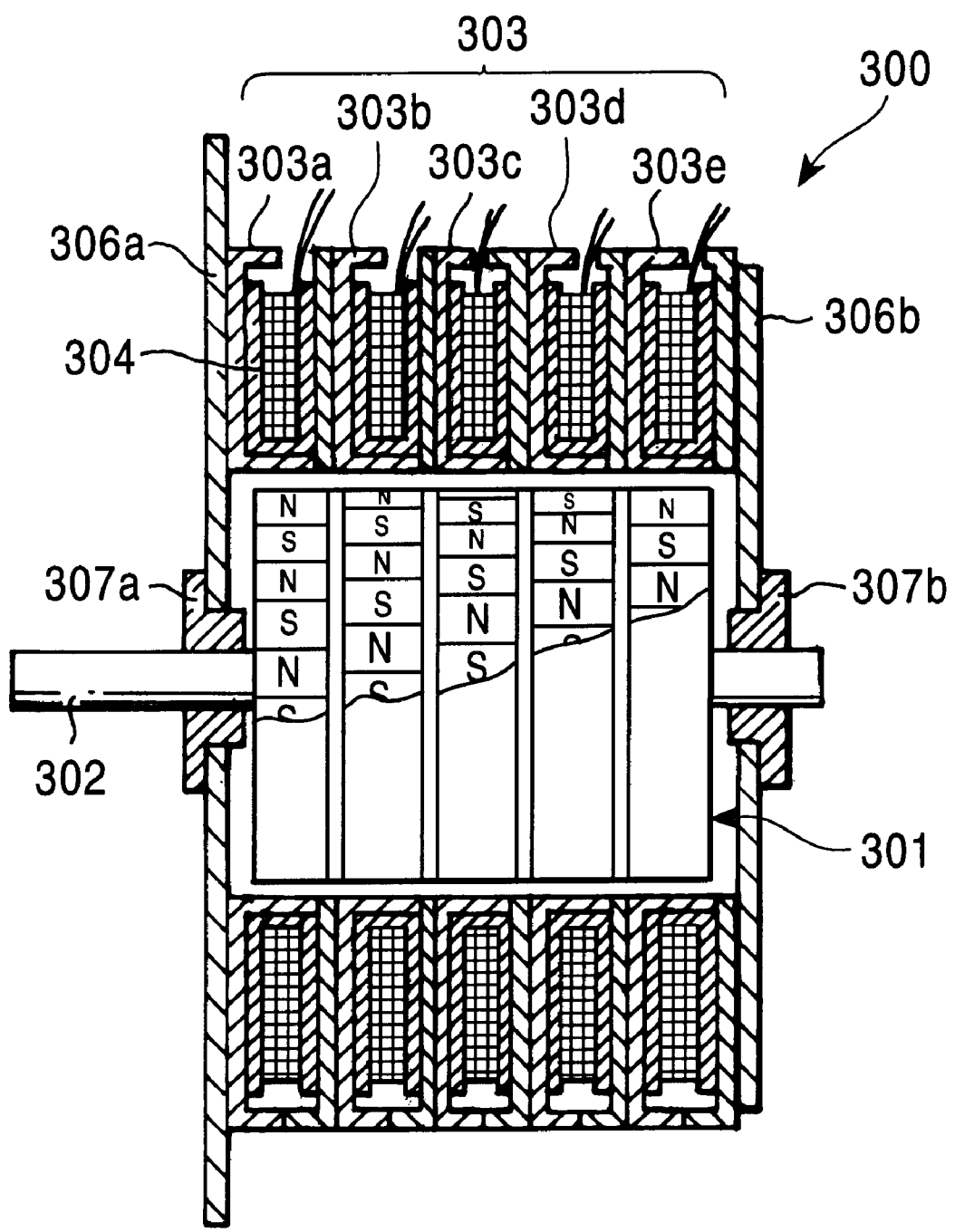
FIG. 31 is a vertically-sectioned side view of a multi-phase PM-type stepping motor of a third embodiment.
Figure 32:
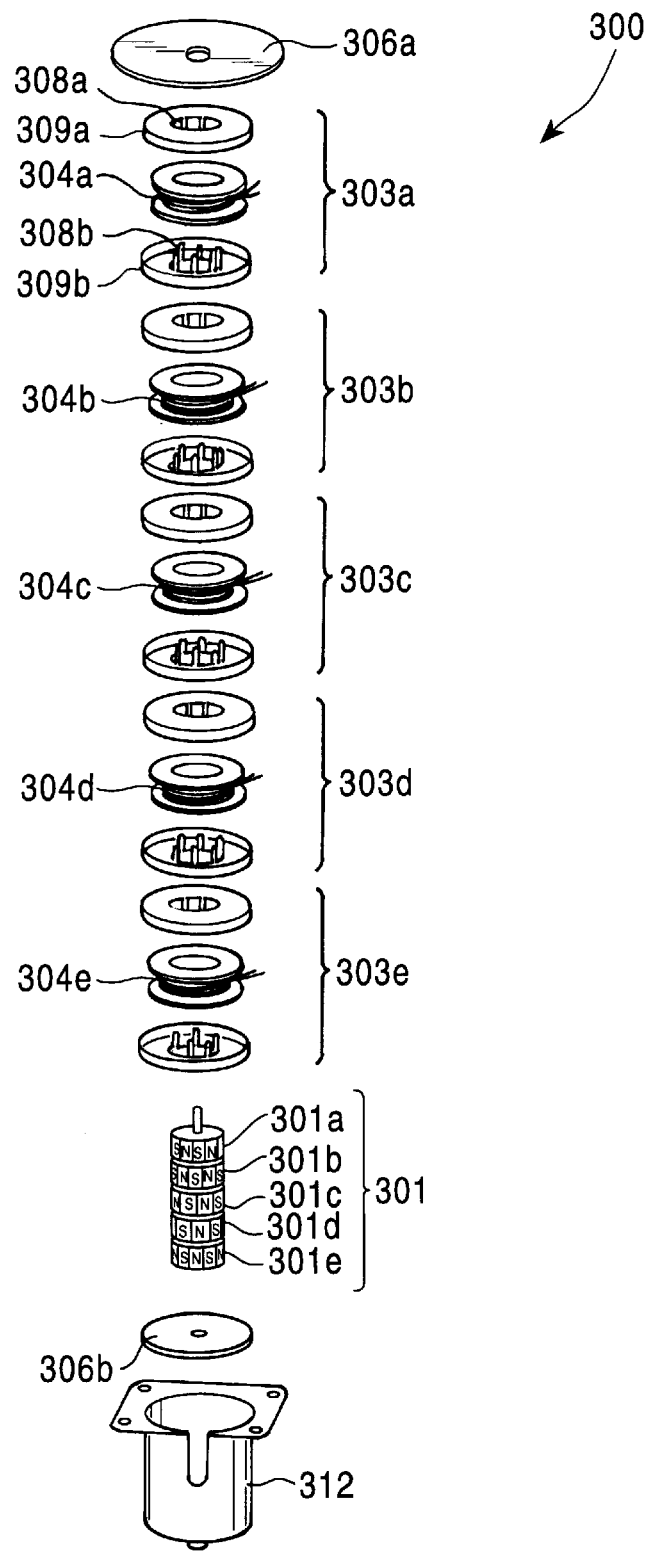
FIG. 32 is an exploded perspective view of the multi-phase PM-type stepping motor of the third embodiment.
Figure 33:
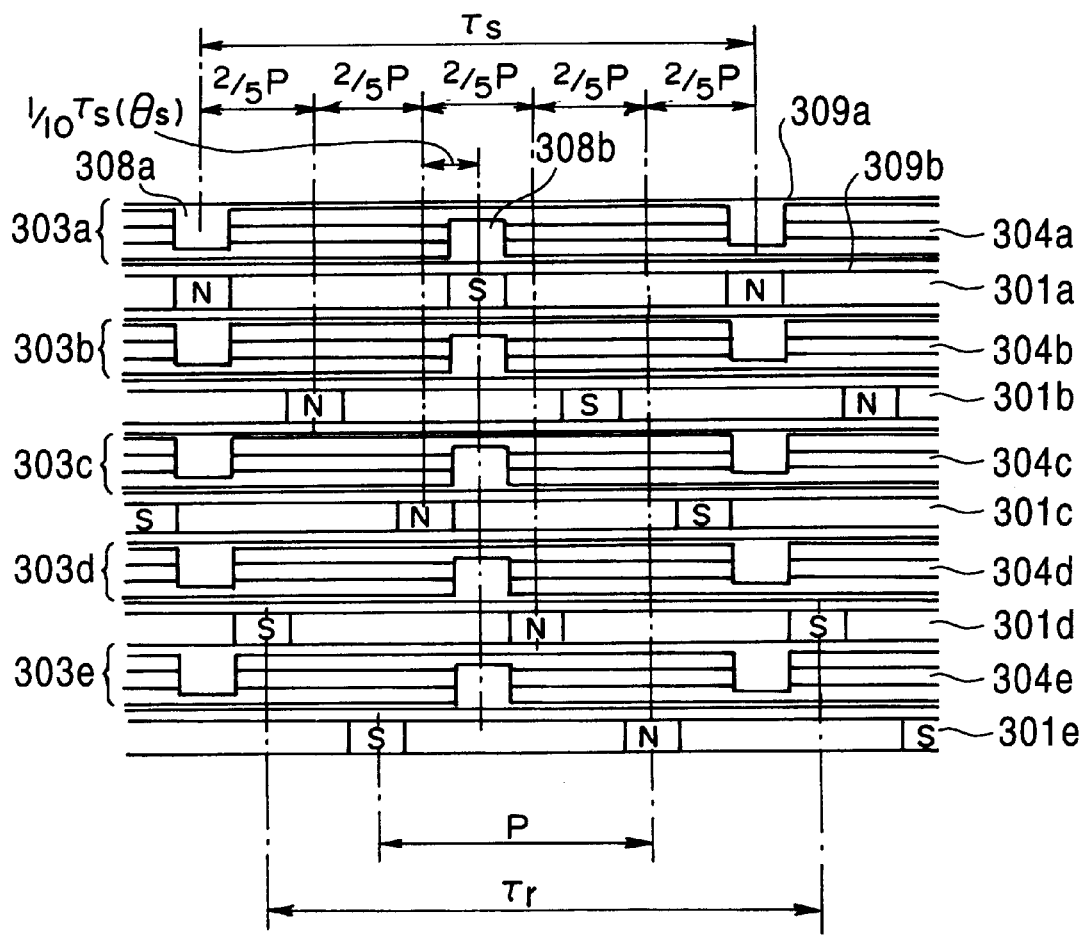
FIG. 33 is a development of the stator and rotor of the multi-phase PM-type stepping motor of the third embodiment.
Figure 34:
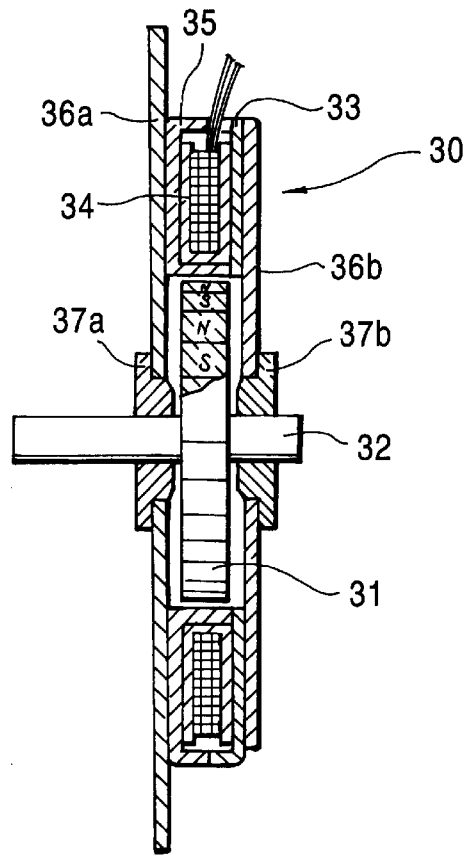
FIG. 34 is a vertically-sectioned side view of a single-phase PM-type stepping motor which is a first example of prior art.
Figure 35:
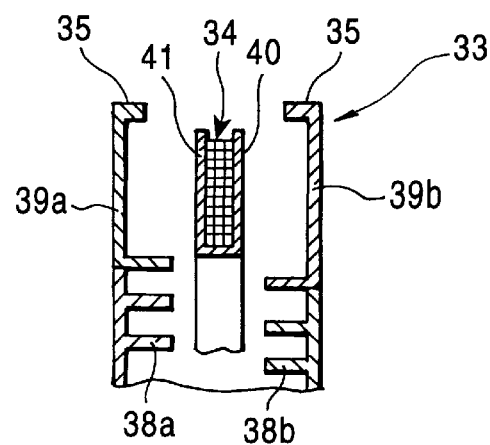
FIG. 35 is an exploded perspective view of the single-phase PM-type stepping motor which is the first example of prior art.
Figure 36:
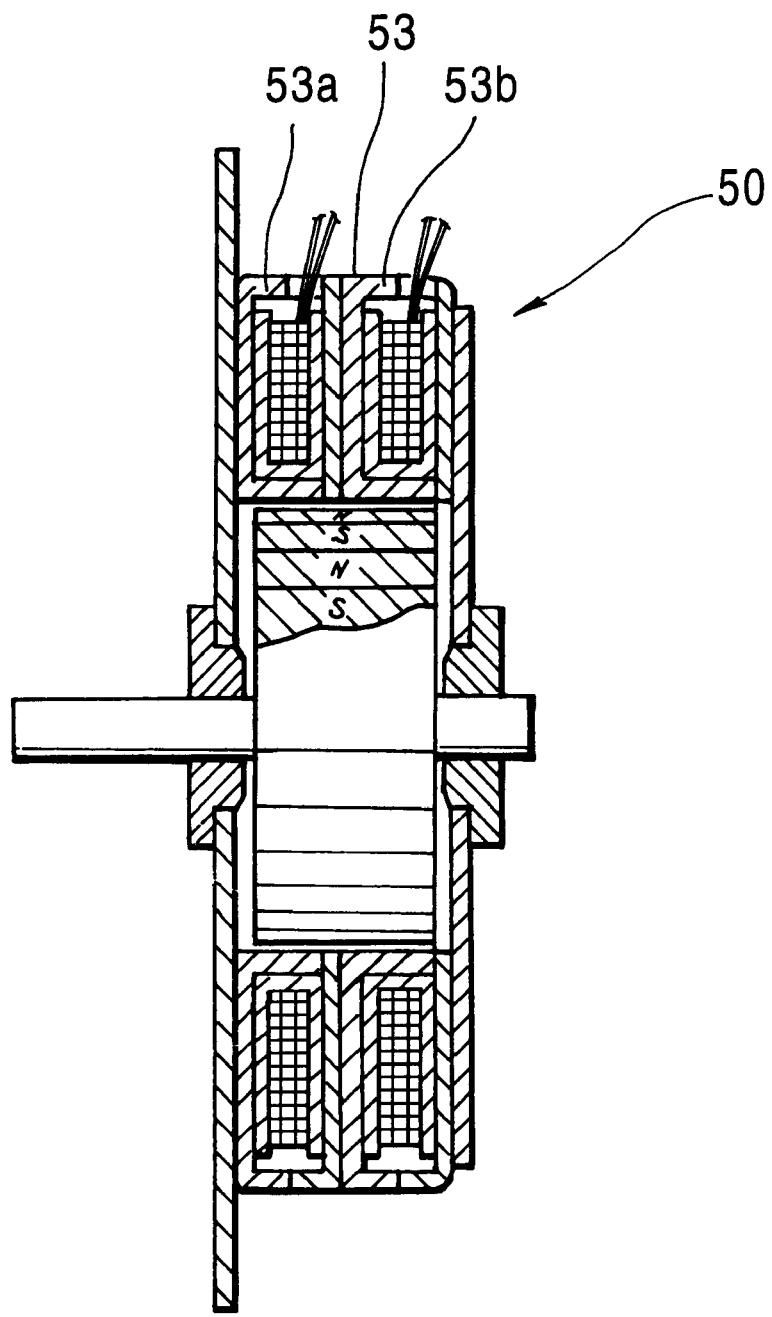
FIG. 36 is a vertically-sectioned side view of a two-phase PM-type stepping motor which is a second example of prior art.

FIG. 31 is a vertically-sectioned side view illustrating a multi-phase PM-type stepping motor 300 which is the third embodiment of the present invention, FIG. 32 is an exploded perspective view illustrating the multi-phase PM-type stepping motor 300, and FIG. 33 is a development of a stator 303 and a rotor 301 of the stepping motor 300.

In the multi-phase PM-type stepping motor 300 of the third embodiment, as shown in FIGS. 31 and 32, the stator 303 is constituted by five, first to fifth, stator portions 303a to 303e ganged in the axial direction, and the rotor 301 is constituted by five, first to fifth, rotor portions 301a to 301e ganged in the axial direction. The positions of respective comb-like pole teeth 308a and 308b of each of the stator portions 303a to 303e and N and S magnetic poles on the outer circumferential surface of each of the rotor portions 301a to 301e of the rotor 301 are established in such a manner as shown in FIG. 33.

That is, when one or the other of the pole teeth 308a and 308b in each of the yoke elements 309a and 309b are arranged at a pole teeth pitch of τs, the other-side pole teeth 308b are shifted by τs/2 from the one-side pole teeth 308a in a circumferential direction in each of the first to fifth stator portions 303a to 303e so that first to fifth stator portions are ganged in a state that the respective pole teeth 308a of the first to fifth stator portions 303a to 303e are aligned with each other, and the respective pole teeth 308b of the first to fifth stator portions 303a to 303e are aligned with each other.

On the other hand, when the N and S poles of each of the rotor portions 301a to 301e of the rotor 301 are arranged at a pitch τr respectively, the relation of τr=τs is established. Therefore, a distance P between N and S poles adjacent to each other is set so as to satisfy P=τr/2.

The magnetic poles of the first rotor portion 301a and the magnetic poles of the second rotor portion 301b are shifted by 2P/5 from each other.

The magnetic poles of the second rotor portion 301b and the magnetic poles of the third rotor portion 301c are shifted by 2P/5 from each other.

The magnetic poles of the third rotor portion 301c and the magnetic poles of the fourth rotor portion 301d are shifted by 2P/5 from each other.

The magnetic poles of the fourth rotor portion 301d and the magnetic poles of the fifth rotor portion 301e are shifted by 2P/5 from each other.

In FIG. 31, the reference numeral 302 represents a rotating shaft: 304, a stator coil; 306a and 306b, motor mounting plates; and 307a and 307b, bearings for the rotating shaft 302. In addition, in FIG. 32, the reference numeral 312 represents a motor housing.

The operation of the multi-phase PM-type stepping motor 300 of the third embodiment is similar to that illustrated in FIG. 19, and therefore the operation will be decried without illustrating the steps in the drawings.

In Step 1, a current is made to flow only in the stator coil 304a so that all the one-side pole teeth 308a of the first stator portion 303a become N, while all the other-side pole teeth 308b of the first stator portion 303a become S. In this Step 1, therefore, the magnetic poles S of the first rotor portion 301a are attracted to N of the pole teeth 308a of the first stator portion 303a, while the magnetic poles N of the first rotor portion 301a are attracted to S of the pole teeth 308b of the first stator portion 303a so that the magnetic poles S of the first rotor portion 301a are aligned with N of the pole teeth 308a of the first stator portion 303a, while the magnetic poles N of the first rotor portion 301a are aligned with S of the pole teeth 308b of the first stator portion 303a, respectively.

Next, in Step 2, a current is made to flow only in the stator coil 304c so that the one-side pole teeth 308a of the third stator portion 303c become S, while the other-side pole teeth 308b of the third stator portion 303c become N. As a result, the magnetic poles N and S of the third rotor portion 301c are attracted by, moved to, and aligned with S and N of the pole teeth 308a and 308b of the third stator portion 303c, respectively. At this time, the magnetic poles of the rotor 301 move by τr/10.

Further, in Step 3, a current is made to flow only in the stator coil 304e so that all the one-side pole teeth 308a of the fifth stator portion 303e become N, while all the other-side pole teeth 308b of the fifth stator portion 303e become S. As a result, the magnetic poles S and N of the fifth rotor portion 301e are attracted by, moved to, and aligned with N and S of the pole teeth 308a and 308b of the fifth stator portion 303e, respectively. Thus, the rotor 301 moves by one step.

Further, in Step 4, a current is made to flow only in the stator coil 304b so that all the one-side pole teeth 308a of the second stator portion 303b become S, while all the other-side pole teeth 308b of the second stator portion 303b become N. As a result, the magnetic poles N and S of the second rotor portion 301b are attracted by, moved to, and aligned with S and N of the pole teeth 308a and 308b of the second stator portion 303b, respectively.

Further, in Step 5, a current is made to flow only in the stator coil 304d so that all the one-side pole teeth 308a of the fourth stator portion 303d become N, while all the other-side pole teeth 308b of the fourth stator portion 303d become S. As a result, the magnetic poles S and N of the fourth rotor portion 301d are attracted by, moved to, and aligned with N and S of the pole teeth 308a and 308b of the fourth stator portion 303d, respectively.

In Steps 6, 7, 8, 9 and 10, the direction of the current made to flow in the stat or coils 304a to 304e is reversed to that in Steps 1, 2, 3, 4 and 5 respectively, similarly to the case shown in FIG. 18. In such a manner, the rotor 301 is moved in the direction of arrow similarly to the case shown in FIG. 18, so that the rotor 301 returns, in Step 11, to the initial position of Step 1. The step angle θs at this time is τr/10.

The specific operation of the multi-phase PM-type stepping motor 300 of the third embodiment is similar to that shown in FIG. 23, and, therefore, the specific operation will be decried without illustrating the steps in the drawings.

In Step 1, all the one-side pole teeth 308a of the first stator portion 303a and the other-side pole teeth 308b of the fourth stator portion 303d are made to become N, while all the other-side pole teeth 308b of the first stator portion 303a and the one-side pole teeth 308a of the fourth stator portion 303d are made to become S.

In Step 2, the one-side pole teeth 308a of the third stator portion 303c are made to become S and the other-side pole teeth 308b of the third stator portion 303c are made to become N, while the one-side pole teeth 308a and the other-side pole teeth 308b of the first stator portion 303a are kept in N and S respectively.

In Step 3, the one-side pole teeth 308a of the fifth stator portion 303e are made to become N and the other-side pole teeth 308b of the fifth stator portion 303e are made to become S, while the one-side pole teeth 308a and the other-side pole teeth 308b of the third stator portion 303c are kept in S and N respectively.

In Step 4, the one-side pole teeth 308a of the second stator portion 303b are made to become S and the other-side pole teeth 308b of the second stator portion 303b are made to become N, while the one-side pole teeth 308a and the other-side pole teeth 308b of the fifth stator portion 303e are kept in N and S respectively.

In Step 5, the one-side pole teeth 308a of the fourth stator portion 303d are made to become N and the other-side pole teeth 308b of the fourth stator portion 303d are made to become S, while the one-side pole teeth 308a and the other-side pole teeth 308b of the second stator portion 303b are kept in S and N respectively.

In Steps 6, 7, 8, 9 and 10, the direction of the current made to flow in the stator coils 304a to 304e is reversed to that in Steps 1, 2, 3, 4 and 5, respectively, to thereby make the N and S reverse to the case in the steps 1 to 5. The state returns, in Step 11, to Step 1.

Configured as mentioned above, the multi-phase PM-type stepping motor according to the present invention has superior effects as follows.

(1) Since magnetic poles can be made wider than those in a two-phase PM-type stepping motor when the same step angle is to be obtained, the torque is improved by 20% or more in comparison with a conventional motor having the same shape.

(2) In the case where the number of magnetic poles of a rotor is the same, a smaller step angle can be obtained in comparison with a two-phase PM-type stepping motor.

(3) While a conventional two-phase PM-type stepping motor requires at least 4 lead wires and 8 transistors for a driving circuit, the stepping motor according to the present invention requires only three lead wires and 6 transistors. Accordingly, the driving circuit can be simplified on a large scale.

(4) While the phase angle of a current is 60° in a known three-phase PM-type stepping motor, the phase angle is 120° in the stepping motor according to the present invention. Accordingly, the stepping motor can be used also as a brushless motor if a position detection means is provided.

(5) Developed into a multi-phase PM-type stepping motor of n=3, the stepping motor according to the present invention can be used also as a three-phase AC motor if the impedance of windings is changed.

(6) When a conventional stepping motor of the prior art is developed into a five-phase PM-type stepping motor by making n=5, at least 10 lead-out terminals of stator coils are required. Therefore, at least 20 transistors are required for a driving circuit. However, when the stepping motor according to the present invention is developed into a five-phase PM-type stepping motor by making n=5, the number of lead wires can be reduced to 5, and the number of transistors can be reduced to 10. Accordingly, the driving circuit can be simplified on a large scale.

(7) Developed into a three-phase PM-type stepping motor by making n=3, the stepping motor according to the present invention can be operated also under delta connection. Developed into a five-phase PM-type stepping motor by making n=5, the stepping motor can be operated also under pentagonal connection. Various driving systems can be selected in comparison with the case of a two-phase PM-type stepping motor.

What is claimed is:

1. A multi-phase permanent magnet stepping motor comprising:

a rotor constituted by a cylindrical permanent magnet with N poles and S poles magnetized alternatively on an outer circumferential surface of said rotor;

a plurality of stator cores having teeth arranged in opposition to said N poles or said S poles on the outer circumferential surface of said rotor through a predetermined air gap, wherein, when the number of said stator cores is represented by n (n is an odd number not smaller than 5), and the magnetization pitch angle of said permanent magnet is represented by P, said teeth of each of said stator cores are shifted from teeth of adjacent stator cores by an angle of 2P/n;

n excitation coils wound in said stator cores and for magnetizing said stator cores to thereby rotate said rotor; and a driving circuit configured to drive the excitation coils, comprising n series-connected pairs of transistors arranged for successive bipolar operation of the excitation coils, wherein each of the series-connected pair is coupled between a voltage and ground.

2. A multi-phase permanent magnet stepping motor according to claim 1, wherein n is 5.

3. A multi-phase permanent magnet stepping motor comprising a group of n rotors and a group of n stators (n being an odd number not smaller than 3 associated with said n rotors respectively and correspondingly);

each of said n rotors being constituted by a cylindrical permanent magnet with N poles and S poles magnetized alternatively on an outer circumferential surface of said each rotor;

each of said stators being constituted by a stator core having teeth arranged in opposition to said N poles or said S poles on the outer circumferential surface of an associated rotor through a predetermined air gap, and an excitation coil wound in said stator core for magnetizing said stator core to thereby rotate said associated rotor;

said n stators being stacked one on another at the same pitch;

a driving circuit configured to drive the excitation coils, comprising n series-connected pairs of transistors arranged for successive bipolar operation, wherein each of the series-connected pair is coupled between a voltage and ground, and said rotors being stacked one on another with a relation that magnetic poles of an $m^{th}$ rotor are shifted from magnetic poles of an $(m-1)^{th}$ rotor by an angle of 2P/n (m being an integer not smaller than 2 and not larger than n) where P represents the magnetization pitch angle of said permanent magnet.

4. A multi-phase permanent magnet stepping motor according to claim 3, wherein n is 3.

5. A multi-phase permanent magnet stepping motor according to claim 3, wherein n is 5.

* * * * *